(12) United States Patent
Sakajo et al.

(10) Patent No.: US 7,462,414 B2
(45) Date of Patent: Dec. 9, 2008

(54) FUEL CELL SYSTEM

(75) Inventors: Yuichi Sakajo, Toyohashi (JP); Naoto Hotta, Aichi-gun (JP); Ken Matsunaga, Kariya (JP)

(73) Assignee: Denso Corporation, Kariya (JP)

( * ) Notice: Subject to any disclaimer, the term of this patent is extended or adjusted under 35 U.S.C. 154(b) by 6 days.

(21) Appl. No.: 11/822,440

(22) Filed: Jul. 5, 2007

(65) Prior Publication Data
US 2008/0145731 A1    Jun. 19, 2008

(30) Foreign Application Priority Data
Jul. 24, 2006    (JP)    ............... 2006-200585

(51) Int. Cl.
*H01M 8/04*    (2006.01)
(52) U.S. Cl. .......................... 429/26; 429/25
(58) Field of Classification Search ........... None
See application file for complete search history.

(56) References Cited

U.S. PATENT DOCUMENTS 6,347,528 B1    2/2002    Iritani et al.
6,910,345 B2    6/2005    Horstmann et al.
7,040,109 B2 *  5/2006    Kimbara et al. ............ 62/259.2
2002/0114985 A1 * 8/2002  Shkolnik et al. ............... 429/20

FOREIGN PATENT DOCUMENTS

| JP | A 2002-005532 |   | 1/2002 |
| JP | A 2002-280006 |   | 9/2002 |
| JP | A 2005-511373 |   | 4/2005 |
| JP | 2005-178524   | * | 7/2005 |

* cited by examiner

*Primary Examiner*—John S Maples
(74) *Attorney, Agent, or Firm*—Oliff & Berridge, PLC

(57) ABSTRACT

A fuel cell system has a fuel cell, an air-refrigerant heat exchanger, and primary and secondary expansion valves. The air-refrigerant heat exchanger performs heat exchange between exhaust air discharged from the fuel cell and a refrigerant in a refrigeration cycle. The primary expansion valve reduces the pressure of the refrigerant at an upstream side of the air-refrigerant heat exchanger. The secondary expansion valve reduces the pressure of the refrigerant at a downstream side of the air-refrigerant heat exchanger. While the air-refrigerant heat exchanger performs the heat-exchange from the air to the refrigerant, the primary expansion valve controls a reduced magnitude of the pressure of the refrigerant so that a temperature of the refrigerant is set to a specified value within a range of 0° C. to 5° C., preferably set to 0° C., at which water component contained in the air does not freeze.

13 Claims, 11 Drawing Sheets

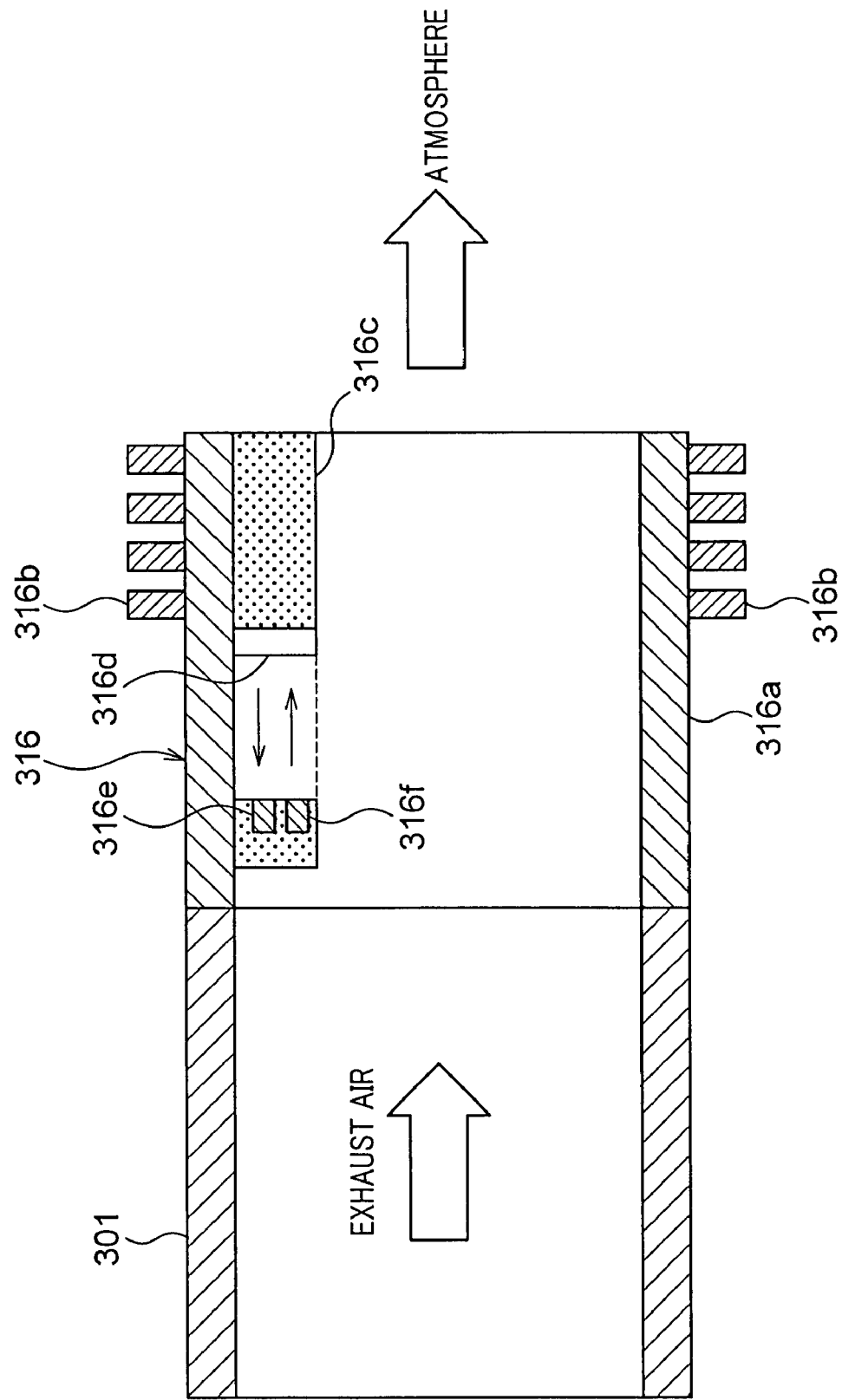

FUEL CELL SYSTEM

CROSS-REFERENCE TO RELATED APPLICATION

This application is related to and claims priority from Japanese Patent Application No. 2006-200585 filed on Jul. 24, 2006, the contents of which are hereby incorporated by reference.

BACKGROUND OF THE INVENTION

1. Field of the Invention

The present invention relates to a fuel cell system equipped with fuel cells capable of generating electrical energy by electrochemical reaction of combining hydrogen and oxygen, and suitably applicable to movable bodies such as automotive vehicles, electric vehicles, marine vessels, and other mobile devices equipped with a refrigeration cycle for use of air conditioning and the like.

2. Description of the Related Art

In a fuel cell vehicle equipped with a fuel cell system composed of a fuel cell stack to be used as vehicle's driving power, the temperature of a cooling water for use of the fuel cell system is approximately 80° C., and which is lower than the temperature of a cooling water (approximate 100° C.) for use of cooling an internal combustion engine mounted on the vehicle. There is accordingly a possibility of not always providing an adequate heating performance of the air conditioning when only the cooling water for the fuel cell system is used for heating the air in the compartment of the vehicle.

There are many conventional techniques using a refrigeration cycle (or a heat pump) as a power source for heating the compartment of a vehicle. Japanese patent Kohyo (Japan unexamined national publication of translated version for PCT/DE2002/003876) No. JP 2005-511373 has disclosed one of those conventional techniques.

In general, because super-charged air (oxidizing gas) of a high temperature is supplied to a fuel cell stack in a fuel cell system, waste heat of exhaust air discharged from the fuel cell stack is circulated and returned to a refrigeration cycle in the fuel cell system. However, because the exhaust air contains a lot of water component, the water component contained in the exhaust air becomes frozen when the temperature of a refrigerant flowing through the refrigeration cycle becomes not more than its freezing point. This phenomenon decreases heat exchanger effectiveness in the fuel cell system. In the worst case, a pipe through which the exhaust air flows is plugged or blocked by the frozen water. At last, the fuel cell system thereby stops.

SUMMARY OF THE INVENTION

It is an object of the present invention to provide a fuel cell system equipped with a fuel cell stack capable of preventing water component contained in an exhaust air from freezing, where the exhaust air is discharged from the fuel cell stack in order to recover the energy of waste heat of the exhaust air into a refrigeration cycle.

To achieve the above purposes, the present invention provides a fuel cell system has a fuel cell, an oxidizing agent gas exhaust passage, a refrigerant circulation passage, a refrigerant compressor, a refrigerant-outdoor air heat exchanger, an oxidizing agent gas-refrigerant heat exchanger, a primary pressure reducing valve, and a secondary pressure reducing valve. In the fuel cell system, the fuel cell generates electrical power by performing electrochemical reaction of combining oxidizing agent gas and fuel gas. Through the oxidizing agent gas exhaust passage, non-reacted residual oxidizing agent gas in the oxidizing agent gas supplied to the fuel cell passes to the outside of the fuel cell system. Through the refrigerant circulation passage, refrigerant is circulated. The refrigerant compressor compresses the refrigerant and sends the compressed refrigerant to the refrigerant circulation passage. The refrigerant-outdoor air heat exchanger performs heat exchange between an outdoor air and the refrigerant discharged from the refrigerant compressor. The oxidizing agent gas-refrigerant heat exchanger performs heat exchange between the oxidizing agent gas passing through the oxidizing agent gas exhaust passage and the refrigerant passing through the refrigerant circulation passage. The primary pressure reducing valve is disposed between the refrigerant compressor and the oxidizing agent gas-refrigerant heat exchanger. The primary pressure reducing valve performs the reduction of a pressure of the refrigerant. The secondary pressure reducing valve is disposed between the oxidizing agent gas-refrigerant heat exchanger and the refrigerant-outdoor air heat exchanger. The secondary pressure reducing valve performs the reduction of a pressure of the refrigerant. In the fuel cell system having the above configuration, during the heat transfer between the oxidizing agent gas and the refrigerant by the oxidizing agent gas-refrigerant heat exchanger, the primary pressure reducing valve reduces the pressure of the refrigerant so that a temperature of the refrigerant becomes not less than a specified temperature at which water component contained in the oxidizing agent gas does not freeze.

In the fuel cell system, according to the present invention, the pressure of the refrigerant is reduced in two stages, at the upstream side of the oxidizing agent gas-refrigerant heat exchanger and at the down stream side of the oxidizing agent gas-refrigerant heat exchanger. In the primary pressure reduction stage, the pressure of the refrigerant is so controlled by the primary pressure reducing valve that its temperature is not less than the specified temperature value. This operation can prevent the generation of freezing water components contained in the oxidizing agent gas discharged from the fuel cell while the oxidizing agent gas-refrigerant heat exchanger performs the heat exchanger between the oxidizing agent gas and the refrigerant. It is thereby possible to avoid freezing the water component contained in the oxidizing agent gas discharged from the fuel cell in the oxidizing agent gas exhaust passage.

In the fuel cell system as another aspect of the present invention, the specified temperature is a value within a temperature range of 0° C. to 5° C. It is preferable to set the specified temperature to 0° C. It is thereby possible to avoid freezing the water component contained in the oxidizing agent gas by the temperature of the refrigerant whose pressure has been reduced by the primary pressure reducing valve.

In the fuel cell system as another aspect of the present invention, while the oxidizing agent gas-refrigerant heat exchanger performs the heat transfer between the oxidizing agent gas and the refrigerant, the secondary pressure reducing valve reduces the pressure of the refrigerant so that a temperature of the refrigerant becomes not more than an outdoor temperature. By further reducing the pressure of the refrigerant by the secondary pressure reducing valve, it is possible for the refrigerant to absorb the thermal energy of the outdoor air.

As another aspect of the present invention, the fuel cell system further has the third pressure reducing valve and the evaporator. The third reducing valve reduces the pressure of the refrigerant at an outlet side of the refrigerant-outdoor air heat exchanger. The evaporator evaporates the refrigerant of a low pressure which is reduced by the third pressure reducing valve and for cooling air-conditioning air to be used of cooling an inside of a compartment. In the fuel cell system, an opening ratio of each of the primary pressure reducing valve and the secondary pressure reducing valve is changeable, and each of the primary pressure reducing valve and the secondary pressure reducing valve is open to its full width while the evaporator cools the air-conditioning air. It is thereby possible to supply the refrigerant of a high temperature and a high pressure into the refrigerant-outdoor air heat exchanger when the refrigeration cycle is used as the cooling operation.

As another aspect of the present invention, the fuel cell system further has an oxidizing agent gas radiator mounted on the oxidizing agent gas exhaust passage for discharging thermal energy of the oxidizing agent gas, which flows through the oxidizing agent gas exhaust passage, to the outside of the fuel cell system. It is thereby possible to reduce the refrigerant by transferring the thermal energy of the refrigerant to the oxidizing agent gas. This can enhance the efficiency of the refrigeration cycle.

As another aspect of the present invention, the fuel cell system further has a fan for sending outdoor air to the oxidizing agent gas radiator. It is thereby possible to efficiently cool the oxidizing agent gas by using such a fan.

As another aspect of the present invention, the fuel cell system further has a primary bypass passage for bypassing the oxidizing agent gas radiator from the oxidizing agent gas exhaust passage through which the oxidizing agent gas flows. It is possible to efficiently use the waste heat of the oxidizing agent gas because the oxidizing agent gas does not flow through the oxidizing agent gas radiator and can thereby keep the temperature thereof by bypassing the oxidizing agent gas radiator.

As another aspect of the present invention, the fuel cell system further has a secondary bypass passage for bypassing the oxidizing agent gas-refrigerant heat exchanger from the oxidizing agent gas exhaust passage through which the oxidizing agent gas flows. It is possible to prevent freezing water component contained in the oxidizing agent gas by bypassing the oxidizing agent gas-refrigerant heat exchanger when the temperature of the refrigerant becomes lower than the specified temperature.

As another aspect of the present invention, the fuel cell system further has a dew condensation detection sensor for detecting dew condensation generated from water component contained in the oxidizing agent gas discharged from the oxidizing agent gas exhaust passage to the outside of the fuel cell system. In the fuel cell system, on detecting the generation of the dew condensation by the dew condensation detection sensor, the oxidizing agent gas radiator increases its amount of thermal energy of the oxidizing agent gas to be radiated. It is thereby possible to prevent generating fog when the oxidizing agent gas is discharged to the outside of the fuel cell. Even if the fuel cell system according to the present invention is applied to a vehicle, it is possible to avoid reducing the driver's vision owning to the fog and to keep the driver's safety. It is possible to use a dew point instrument as the dew condensation detection sensor.

In the fuel cell system as another aspect of the present invention, the dew point detection sensor is composed of a pipe, a mirror surface, a luminous part, a light receiving part, and a heat transfer means. The oxidizing agent gas to be discharged from the oxidizing agent gas exhaust passage to the outside passes through the pipe. The mirror surface is disposed on the inner surface of the pipe, the luminous part emits light to the mirror surface. The light receiving part receives the light reflected by the mirror surface. The heat transfer means transfers the thermal energy between the mirror surface and the outdoor air. It is thereby possible to detect whether fog occurs or not when the oxidizing agent gas is discharged to the outside of the fuel cell system mounted on the vehicle.

In the fuel cell system as another aspect of the present invention, the mirror surface is disposed on the inner surface at the upper side of the pipe. It is thereby possible to prevent error detection caused by water drops even if the water drop is generated at the inner surface of the pipe in the dew point detection sensor.

BRIEF DESCRIPTION OF THE DRAWINGS

A preferred, non-limiting embodiment of the present invention will be described by way of example with reference to the accompanying drawings, in which:

FIG. 11 is a schematic view showing a dew condensation detection sensor mounted on the fuel cell system according to a fourth embodiment of the present invention.

DETAILED DESCRIPTION OF THE PREFERRED EMBODIMENTS

Figure 1:
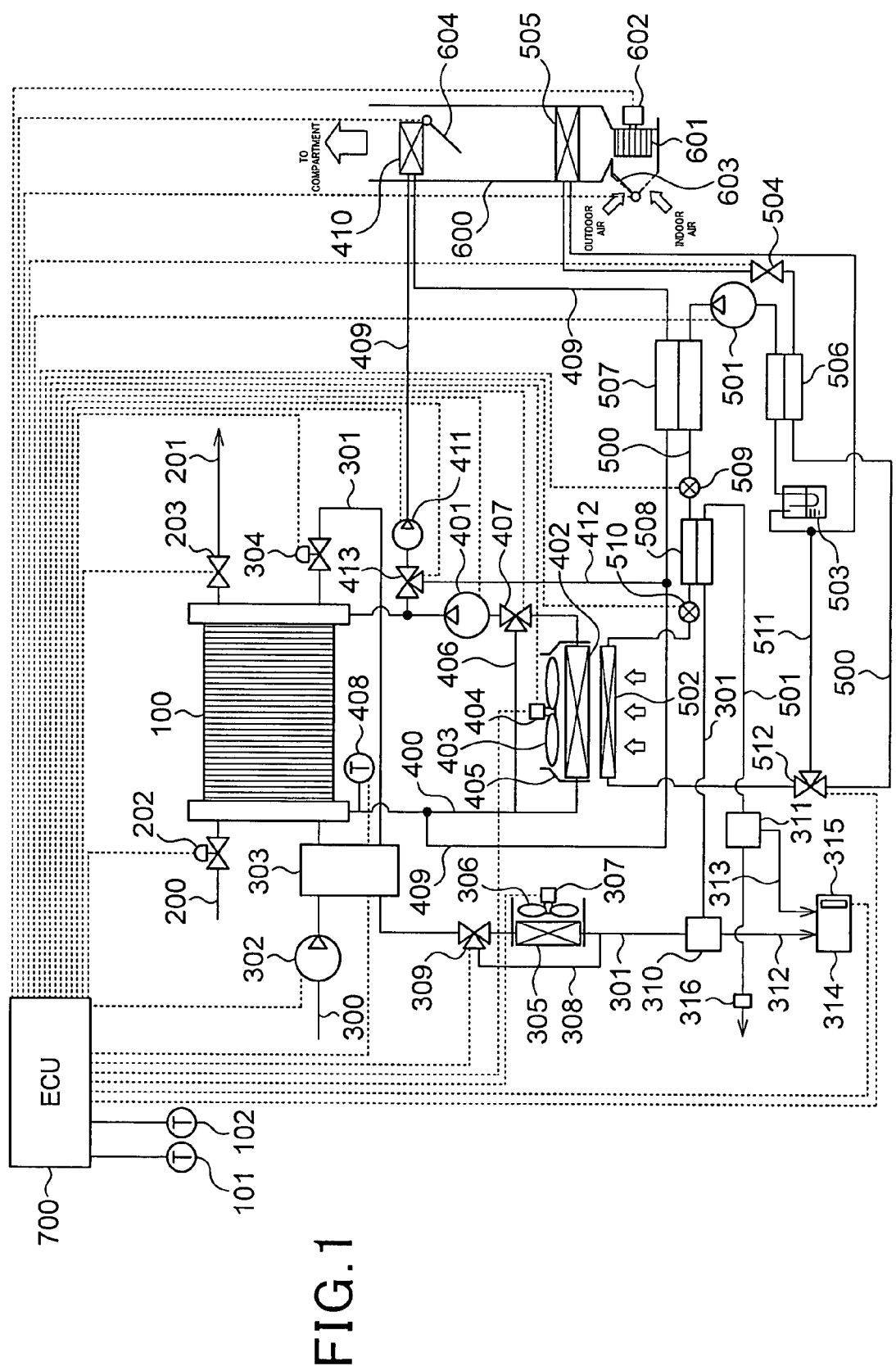
FIG. 1 is a schematic view showing a configuration of a fuel cell system according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the fuel cell system according to the first embodiment of the present invention with reference to FIG. 1 to FIG. 8. The first embodiment is an example of the fuel cell system according to the present invention applied to an electric vehicle (or a fuel cell vehicle).

FIG. 1 is a schematic view showing a configuration of the fuel cell system according to the first embodiment of the present invention. As shown in FIG. 1, The fuel cell system of the first embodiment is equipped with a fuel cell (FC) stack 100 which generates electrical power by electrochemical reaction of combining hydrogen and oxygen. The fuel cell stack 100 supplies the electrical power generated to various types of electrical components mounted on the electric vehicle, such as a drive motor, a secondary battery, and auxiliary equipment (electric motor). The fuel cell stack 100 is composed of a polymer electrolyte fuel cell (PEFC) in which a plurality of unit cells are stacked or laminated in a multilayered structure. The fuel cell system according to the present invention can be applied to another type of the fuel cell system equipped with another types of a fuel cell other than the polymer electrolyte fuel cell (PEFC).

The fuel cell 100 in the fuel cell system of the first embodiment generates electrical energy by the electrochemical reaction of combining hydrogen and oxygen. Hydrogen corresponds to a fuel gas and oxygen (air) corresponds to oxidizing agent gas defined in claims according to the present invention.

Anode (Hydrogen electrode): $2H_2 \rightarrow 4H^+ + 4e^-$,

Cathode (Oxygen electrode): $4H^+ + O_2 + 4e \rightarrow 2H_2O$, and

Entire of the fuel cell 100: $2H_2 + O_2 \rightarrow 2H_2O$.

The fuel cell system has an outdoor sensor 101 and an indoor sensor 102. The outdoor temperature sensor 101 detects an outdoor temperature at the outside of the fuel cell system, and the indoor temperature sensor 102 detects a temperature of air in a compartment of a vehicle.

The fuel cell system of the first embodiment is composed of a hydrogen supply passage 200 and a hydrogen exhaust passage 201. Through the hydrogen supply passage 200, hydrogen gas is supplied to the hydrogen electrode (anode) in the fuel cell 100.

The hydrogen exhaust air discharged from the hydrogen electrode in the fuel cell 100 passes through the hydrogen exhaust passage 201. A hydrogen gas supply apparatus (not shown) is mounted on the upstream side of the hydrogen supply passage 200, and the hydrogen gas is supplied from the hydrogen gas supply apparatus (not shown) to the fuel cell 100 through the hydrogen supply passage 200. The hydrogen gas supply apparatus (not shown) is composed of a hydrogen gas tank in which hydrogen gas of a high pressure is filled.

A hydrogen supply valve 202 is mounted on the hydrogen supply passage 200, and a hydrogen exhaust valve 203 is mounted on the hydrogen exhaust passage 201. On supplying the hydrogen to the fuel cell 100, the hydrogen stored in the hydrogen supply apparatus is supplied into the hydrogen supply passage 200 and the hydrogen supply valve 202 regulates a pressure of the hydrogen suitable for use it in the fuel cell 100. The hydrogen gas is supplied to the hydrogen electrode (anode) in the fuel cell 100. Residual gases such as non-reacted hydrogen gas and oxygen gas are discharged to the outside of the fuel cell system through the hydrogen exhaust passage 201 by opening the hydrogen exhaust valve 203.

The fuel cell system of the first embodiment is equipped with an air supply passage 300 and an air exhaust passage 301. Through the air supply passage 300, oxygen gas (as air) is supplied into the oxygen electrode in the fuel cell 100. The residual air which is not reacted to hydrogen is discharge from the oxygen electrode in the fuel cell 100 to the outside of the fuel cell system through the air exhaust passage 301. The air exhaust passage 301 corresponds to an oxidizing agent gas exhaust passage defined in claims of the present invention.

An air supply apparatus 302 is mounted on the air supply passage 300 in order to supply air (as oxidizing agent gas) into the fuel cell 100. In the first embodiment, an air compressor is used as the air supply apparatus 302 which is driven by a drive motor (not shown).

It is necessary to set the polymer electrolyte fuel cell (PEFC) of the fuel cell 100 into wetting condition involving water component in order to perform electrochemical reaction during electric power generation. In order to achieve such a wetting condition for the PEFC of the fuel cell 100, a moisturizing device 303 is disposed at the downstream side of the air supply apparatus 302 mounted on the air supply passage 300. The moisturizing device 303 extracts water component contained in the exhaust air emitted from the fuel cell 100 and adds the extracted air component into the air supplied from the air supply apparatus 302.

A regulating valve 304 is mounted on the air exhaust passage 301 so as to regulate the pressure (as a back pressure of the fuel cell 100) of the exhaust air so that the oxygen electrode (which will also be referred to as "an air electrode") in the fuel cell 100 has a specified pressure. An air radiator 305 (as an oxidizing agent radiator or an oxidizing agent gas radiator 305) is mounted on the air exhaust passage 301 in order to radiate the thermal energy of the exhaust air discharged from the fuel cell 100. The air radiator 305 is disposed at the position which is directly received by a dynamic pressure of wind while the vehicle is traveling in order to perform the heat exchange between the outdoor air and the exhaust air flowing through the air exhaust passage 301. Thereby the thermal energy of the exhaust air in the air exhaust passage 301 is discharged to the outside of fuel cell system, namely, to the outside of the vehicle. The air radiator 305 corresponds to an oxidizing agent gas radiator defined in claims according to the present invention.

A blowing fan 306 is mounted on the air radiator 305. The blowing fan 306 is driven by a fan motor 307. A radiator bypass passage 308 is mounted on the air exhaust passage 301. The radiator bypass passage 308 bypasses the air radiator 305 from the air exhaust passage 301. An air passage switching valve 309 is mounted on a branch point between the air exhaust passage 301 and the radiator bypass passage 308 so as to switch the flow of the exhaust air discharged from the fuel cell 100. The radiator bypass passage 308 corresponds to a primary bypass passage defined in claims according to the present invention.

An air-refrigerant heat exchanger 508 is configured to perform heat exchange between the air in the air exhaust passage 301 and the refrigerant circulated in the refrigeration cycle which will be described later. The air-refrigerant heat exchanger 508 corresponds to an oxidizing agent gas-refrigerant heat exchanger defined in claims according to the present invention.

A primary gas liquid separator 310 is disposed at the downstream side of the air radiator 305 and at the upper stream side of the air-refrigerant heat exchanger 508. A secondary gas liquid separator 311 is disposed at the downstream side of the air-refrigerant heat exchanger 508. The primary gas liquid separator 310 and the secondary gas liquid separator 311 are configured to separate water component contained in the exhaust air. Such water component contained in the exhaust air has been condensed by cooling the exhaust air in the air exhaust passage 301 by the air radiator 305 and the air-refrigerant heat exchanger 508, respectively.

The water separated by the primary gas liquid separator 310 and the secondary gas liquid separator 311 is supplied into a water storage tank 314 (or a water tank) through water recovering passages 312 and 313. The water collected in the water tank 314 is used for moisturizing the air which will be supplied to the fuel cell 100. In addition, the water stored in the water tank 314 is also used for reforming a device capable of generating hydrogen as the fuel gas to be supplied to the fuel cell 100.

A water volume detection sensor 315 is mounted on the water tank 314 in order to detect the volume or level of the water accumulated in the water tank 314. A liquid-level sensor for detecting the level of the surface of the water in the water tank 314 is used as the water volume detection sensor 315. There are many types of the liquid-level sensors such as an electric capacitance type level gauge, an optical type level sensor, and a float type level sensor.

Condensing the water component contained in the exhaust air discharged from the air exhaust passage 301 to the outside of the fuel cell system generates fog or mist. The visibility of a driver of the vehicle becomes poor owing to the generated fog. In order to avoid such a poor visibility, the fuel cell system of the first embodiment is equipped with a dew condensation detection sensor 316 (or a due point detection sensor 316) disposed at the extreme end of the downstream of the air exhaust passage 301. The dew condensation detection sensor 316 judges whether or not the water component contained in the exhaust air becomes condensed when the exhaust air is discharged from the fuel cell system to the outside and is then contacted with the outdoor air. The dew condensation detection sensor 316 (or the due point detection sensor 316) has a configuration of a related-art technique.

The fuel cell 100 generates thermal energy during its electrical power generation. In order that the fuel cell 100 is cooled to a most suitable operation temperature (approximately 80° C.), the fuel cell system 100 is equipped with a cooling system for cooling the fuel cell 100.

The cooling system is equipped with a cooling water passage 400, a primary water pump 401, and a cooling water radiator 402. Through the cooling water passage 400, the cooling water (as a heating medium) is circulated to the fuel cell 100 by the pressure of the primary water pump 401. The cooling water radiator 402 is equipped with a cooling water fan 403 driven by a fan motor 404. For example, ethylene glycol water solution can be used as the cooling water.

The primary water pump 401 rotates at a specified rotation speed which is controlled by a drive motor (not shown) in order to circulate the cooling water to the fuel cell 100. The cooling water radiator 402 and a refrigerant-outdoor air heat exchanger 502 (which will be explained later) are disposed at the position (for example, at the front end side of the vehicle) which receives a dynamic pressure (a ram pressure) of wind while the vehicle is traveling. Such a placement increases the volume of air flow to be supplied to the cooling water radiator 402 and the refrigerant-outdoor air exchanger 502.

A fan shroud 405 is disposed around the cooling water radiator 402 and the cooling water fan 403. The fan shroud 502 guides the air flow generated by the cooling water fan 403 so that the air forcedly flows toward the cooling water radiator 402 and the refrigerant-outdoor air heat exchanger 502. That is, the presence of the fan shroud 405 enhances the blast efficiently of the cooling water fan 403.

A cooling water bypass passage 406 is mounted on the cooling water passage 400 in order to bypass the cooling water radiator 402. A cooling water flow switching valve 407 is disposed at a junction of the cooling water passage 400 and the cooling water bypass passage 406 in order to regulate the volume of the cooling water flowing into the cooling water bypass passage 406. A solenoid valve (or a magnet valve) or a mechanical valve such as a thermostat valve (or a thermo-control valve) can be used as the cooling water flow switching valve 407. A temperature sensor 408 is disposed as a temperature detection means at the cooling water passage 400 close to the outlet side of the fuel cell 100 in order to detect the temperature of the cooling water discharged from the fuel cell 100. The thermal energy generated in the fuel cell 100 is discharged by the cooling water radiator 402 through the cooling water to the outside of the fuel cell system.

It is possible to control the temperature of the fuel cell 100 by the cooling system described above which is composed mainly of the primary water pump 401 capable of controlling the flow rate of the cooling water, the cooling water fan 403 capable of controlling the blow rate of wind, and the cooling water radiator 402 using the cooling water flow switching valve 407 capable of controlling the flow rate of the cooling water.

A temperature control cooling water passage 409 is mounted on the cooling water passage 400, through which the cooling water is circulated to a heater core 410. The temperature control cooling water passage 409 branches at the downstream side of the primary water pump 401 from the cooling water passage 400, and joins to the downstream side of the fuel cell 100 in the cooling water passage 400.

A secondary water pump 411 is mounted on the temperature control cooling water passage 409, which is capable of forcedly pump the cooling water to the temperature control cooling water passage 409. The rotation speed of the secondary water pump 411 is controlled by a drive motor (not shown) so as to circulate the cooling water to the heater core 410.

A temperature control cooling water bypass passage 412 is disposed at the temperature control cooling water passage 409, by which the heater core 410 is separated from the cooling water passage 400 in order to circulate the cooling water only to the heater core 410.

A temperature control flow passage switching valve 413 is disposed at a junction of the temperature control cooling water passage 409 and the temperature control cooling water bypass passage 412 in order to switch the supply source of the cooling water, which flows into the heater core 410, from the cooling water passage 400 side or the temperature control cooling water bypass passage 412 side. A water-refrigerant heat exchanger 507 in a refrigeration cycle (which will be described later) is disposed at the upstream side of the branch point of the temperature control cooling water bypass passage 412 and at the downstream side of the heater core 410 mounted on the temperature control cooling water passage 409. Switching the temperature-control flow passage switching valve 413 to the temperature control cooling water bypass passage 412 side and driving the secondary water pump 411 can form a closed circulation loop of the cooling water, where the closed circulation loop is a cooling-water flow sequence which is composed of the temperature control cooling water passage 409, the heater core 410, the temperature control cooling water passage. 409, the temperature control cooling water bypass passage 412, the temperature control flow passage switching valve 413, and secondary water pump 411. Switching to the cooling water passage 400 by the temperature control flow passage switching valve 413 can supply a part of the cooling water circulated in the fuel cell 100 to the heater core 410 and the water-refrigerant heat exchanger 507 by performing the primary water pump 401, not performing the secondary water pump 411.

When the primary water pump 401 can not supply the cooling water of a necessary volume into the temperature control cooling water passage 409, it is acceptable to use both the primary water pump 401 and the secondary water pump 411 simultaneously.

The fuel cell system is equipped with a refrigeration cycle for performing heating and cooling the air in the compartment of the vehicle. The refrigeration cycle has a refrigerant circulating passage 500 through which a refrigerant (or coolant) circulates. The refrigerant circulating passage 500 is composed of pipes in which the refrigerant is sealed therein. For example, HFC-134 or $CO_2$ is used as the refrigerant.

The refrigerant circulating passage 500 is equipped with a refrigerant compressor 501, a refrigerant-outdoor air heat exchanger 502, an accumulator 503, a refrigerant expansion valve 504, and an evaporator 505, and the like.

The refrigerant compressor 501 is configured to compress the refrigerant of a gas condition (hereinafter, also referred to as "the gas refrigerant"), and to discharge the compressed refrigerant into the refrigerant circulating passage 500. The refrigerant-outdoor air heat exchanger 502 is an outdoor heat exchanger capable of exchange the heat between the refrigerant and the outdoor air. The refrigerant-outdoor air heat exchanger 502 and the cooling water radiator 402 are disposed one on the top of the other. The accumulator 503 is capable of separating the gas refrigerant from the liquid refrigerant, and capable of supplying the gas refrigerant into the refrigerant compressor 501. The accumulator 503 stores an excess refrigerant therein. The accumulator 503 is composed of a U-shaped pipe having a hole formed at the bottom side thereof in order to supply lubricating oil into the refrigerant compressor 501.

A cooling expansion valve 504 is disposed at the upper stream side of the evaporator 505 on the refrigerant circulating passage 500. The cooling expansion valve 504 makes the liquid refrigerant of a low pressure in order to make the refrigerant in two phases composed of the gas refrigerant and the liquid refrigerant under a low pressure.

The cooling expansion valve 504 is a mechanical type expansion valve capable of adjusting the flow rate of the refrigerant according to the temperature of the refrigerant at the outlet of the evaporator 505 in order that the degree of superheat of the refrigerant at the outlet of the evaporator 505 approaches a specified value. The refrigerant of a low pressure flows from the cooling expansion valve 504 to the evaporator 505.

The refrigerant of a low pressure flowing into the evaporator 505 absorbs the thermal energy of the air supplied from an air conditioning case 600 and thereby evaporated. The cooling expansion valve 504 corresponds to a third pressure reducing valve defined in claims according to the present invention.

An inside heat exchanger 506 is mounted on the refrigerant circulating passage 500 in order to enhance the efficiency of the refrigeration cycle. The inside heat exchanger 506 performs the heat exchange between the refrigerant of a low pressure at the upstream side of the refrigerant compressor 501 and the refrigerant of a high pressure at the downstream side of the refrigerant-outdoor air heat exchanger 502 in order to increase the difference of the refrigerant in enthalpy between the inlet and outlet of the evaporator 505. Because the inside heat exchanger 506 is used only for increasing the efficiency of the refrigeration cycle (COP), it is possible to eliminate it from the refrigeration cycle system in the fuel cell system.

A water-refrigerant heat exchanger 507 is disposed between the refrigerant compressor 501 and the refrigerant-outdoor air heat exchanger 502 in the refrigerant circulating passage 500. The water-refrigerant heat exchanger 507 is configured to perform the heat exchange between the cooling water flowing in the cooling water passage 400 and the refrigerant flowing in the refrigerant circulating passage 500.

An air-refrigerant heat exchanger 508 is disposed between the water-refrigerant heat exchanger 507 and the refrigerant-outdoor air heat exchanger 502 in the refrigerant circulating passage 500. The air-refrigerant heat exchanger 508 is configured to perform the heat exchange between the air flowing in the air exhaust passage 301 and the refrigerant flowing in the refrigerant circulating passage 500.

Two expansion valves 509 and 510 are disposed between the water-refrigerant heat exchanger 507 and the refrigerant-outdoor air heat exchanger 502 in the refrigerant circulating passage 500. The air-refrigerant heat exchanger 508 is disposed between the expansion valve 509 at the upstream side and the expansion valve 510 at the downstream side. Each of the expansion valves 509 and 510 is an electric type expansion valve capable of adjusting its opening. It is possible to open each of the expansion valves 509 and 510 to its full width.

In order to perform the air cooling under the refrigeration cycle, it is necessary to charge the refrigerant of high temperature and high pressure into the refrigerant-outdoor air heat exchanger 502. Because this condition does not require the refrigerant to reduce its pressure by the expansion valves 509 and 510, both the expansion valves 509 and 510 are open to those full widths.

The expansion valve 509 at the upstream side corresponds to a primary pressure reducing valve and the expansion valve 510 at the downstream side corresponds to a secondary pressure reducing pressure valve defined in claims according to the present invention.

A bypass passage 511 is mounted on the refrigerant circulating passage 500 in order to bypass the evaporator 505. A refrigerant passage switching valve 512 is disposed at the branch point between the refrigerant circulating passage 500 and the bypass passage 511 in order to switch the flow of the refrigerant to the evaporator 505 side or the bypass passage 511 side.

The fuel cell system is equipped with the air conditioning apparatus capable of performing air conditioning for the compartment of the vehicle. The air conditioning apparatus is equipped with the air conditioning case 600 through which the air supplied into the compartment of the vehicle flows. An air supply fan 601 is disposed at the upstream side of the air conditioning case 600. The air supply fan 601 is driven by a fan motor 602.

An indoor air and outdoor air switching door 603 is disposed at the upstream side of the air supply fan 601, capable of switching the indoor air (which is the air in the compartment of the vehicle) and the outdoor air (which is the air in the outside of the compartment of the vehicle) in order to suck the air from the switched one into the air conditioning case 600.

The evaporator 505 is disposed at the position immediately behind the air supply fan 601 in the air conditioning case 600, through which the refrigerant is circulated. The heater core 410 is disposed at the downstream side of the evaporator 505 in the air conditioning case 600, through which the cooling water for the cooling system is circulated.

An air mixing door 604 is disposed at the position in the air conditioning case 600 where the heater core 410 is also disposed in the air conditioning case 600.

The air mixing door 604 controls the heating amount to the air by adjusting the volume of the air passing through the heater core 410. The air mixing door 604 is driven by an electric motor (not shown).

The fuel cell system is equipped with a control section 700 (as an electric control unit (ECU)) performing various controls of the components in the fuel cell system described above. The control section 700 is composed of a microcomputer and peripheral circuits. The microcomputer is composed of a CPU, a ROM, a RAM, and the like. The control section 700 inputs various types of signals which are transferred from the outdoor temperature sensor 101, the indoor temperature sensor 102, the water volume detection sensor 315, the temperature sensor 408, and other devices. The control section 700 further inputs signals transferred from an air conditioning mode switch (not shown) mounted on an air conditioning panel in the compartment of the vehicle. Still further, the control section 700 generates control signals based on calculation results, and then outputs those control signals to the hydrogen supply valve 202, the hydrogen exhaust valve 203, the air supply apparatus 302, the regulating valve 304, the motor 307, the air passage switching valve 309, the water pumps 401 and 411, the motor 404, the cooling water flow switching valve 407, the refrigerant passage switching valve 512, the indoor air and outdoor air switching door 603, the air mixing door 604, and the like. Although the control section 700 controls both the operation of the fuel cell system and the air conditioning operation in the first embodiment, it is possible to control both the operations by plural electric control units (ECUs) while communicating between the plural ECUs.

Next, a description will now be given of the air conditioning control according to the first embodiment of the present invention with reference to FIG. 2 to FIG. 8. The control section 700 executes various types of programs stored in the ROM and the like in order to perform the various control operations shown by the flow charts shown in FIG. 2 to FIG. 8.

Figure 2:
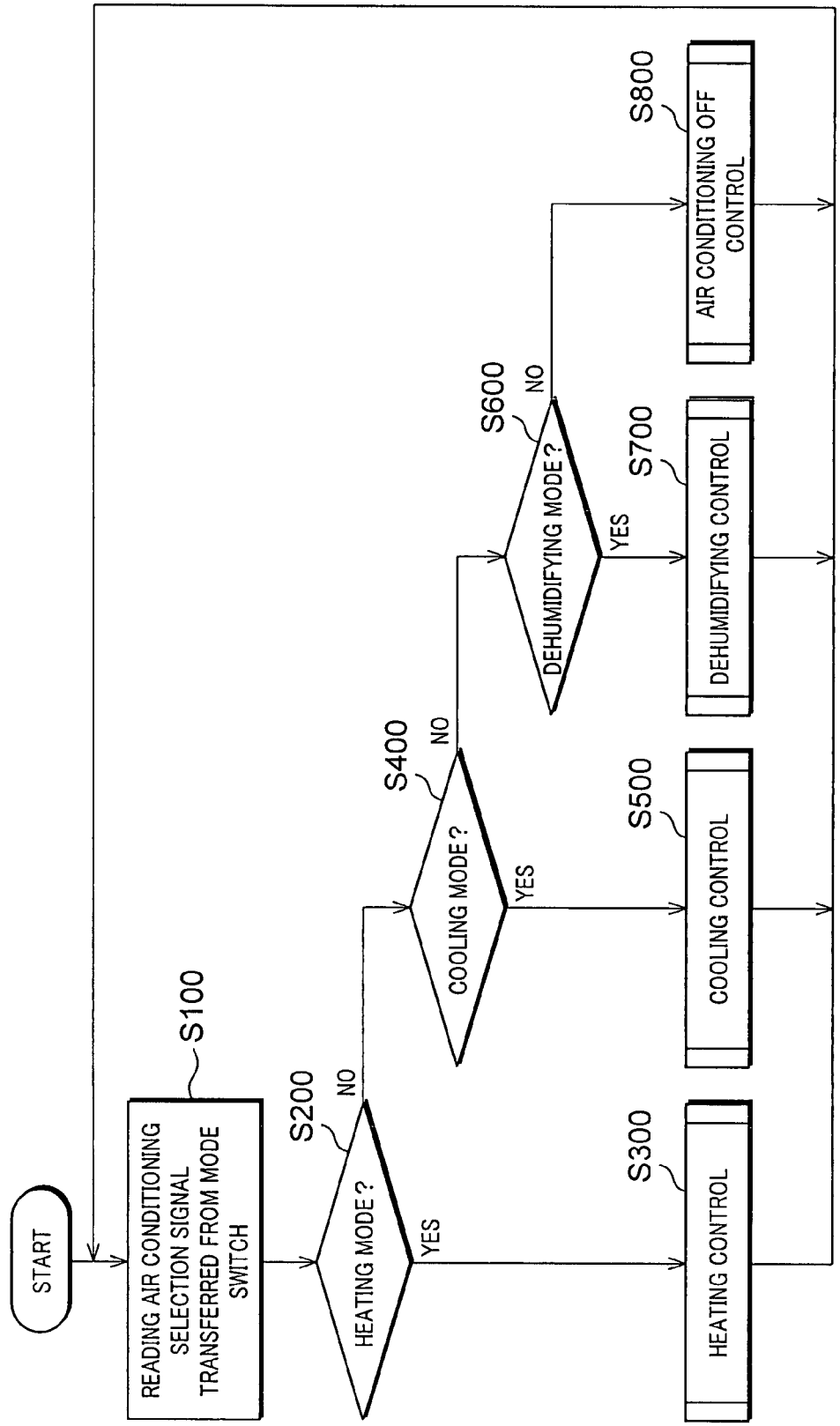
FIG. 2 is a flow chart showing the switching operation under an air conditioning mode in the fuel cell system according to the first embodiment.

FIG. 2 is a flow chart showing the switching operation for the air conditioning mode in the fuel cell system according to the first embodiment.

The driver of a vehicle operates an air conditioning mode switch (not shown) in order to switch the air conditioning mode. It is also possible to automatically judge the necessity of switching the air conditioning mode based on values of a temperature control lever (not shown) disposed at an air conditioning control panel, the condition of a refrigeration cycle switch (not shown), an outdoor temperature detected, an indoor temperature detected and the like.

As shown in FIG. 2, at step S100, the control section 700 reads an air conditioning selection signal transferred from the air conditioning mode switch (not shown) The air conditioning selection signal has been selected by the driver or automatically selected and then.

At step S200, the control section 700 then judges whether the received signal indicates the heating mode or not.

When the judgment result at step S200 indicates the heating mode ("YES" at step S200), the operation flow goes to step S300 in order to perform the heating control.

On the contrary, when the judgment result at step S200 does not indicate the heating mode ("NO" at step S200), the operation flow goes to step S400 in order to further judge whether or not the received signal indicates the cooling mode or not. When the judgment result at step S400 indicates the cooling mode ("YES" at step S400), the operation flow goes to step S500 in order to perform the control operation of the cooling mode.

On the contrary, when the judgment result at step S400 does not indicate the cooling mode ("NO" at step S400), the operation flow goes to step S600 in order to further judge whether the received signal indicates the dehumidifying mode or not. When the judgment result at step S600 indicates the dehumidifying mode ("YES" at step S600), the operation flow goes to step S700 in order to perform the control operation of the dehumidifying mode.

[Heating Mode]

A description will now be given of the air conditioning control under the heating mode in the fuel cell system according to the first embodiment.

Figure 3:
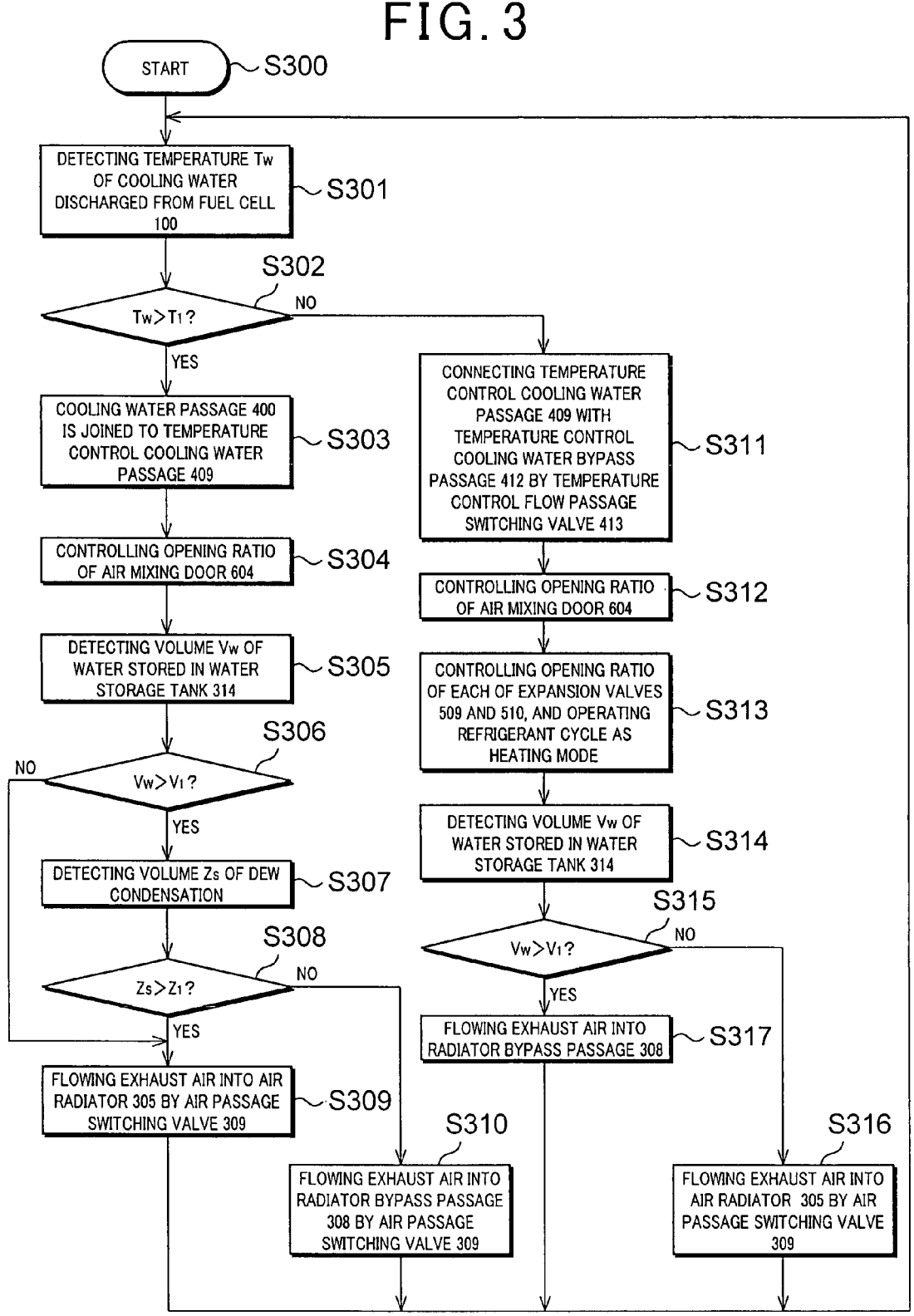
FIG. 3 a flow chart showing the control flow for the air conditioning under a heating mode in the fuel cell system according to the first embodiment.

At first, the air conditioning control under the heating mode in the fuel cell system will be explained. FIG. 3 is a flow chart showing the air conditioning control flow under the heating mode in the fuel cell system according to the first embodiment.

As shown in FIG. 3, the temperature sensor 408 detects the temperature Tw of the cooling water at the outlet of the fuel cell 100 at step S301. Next, the control section 700 receives the signal indicating the temperature of the cooling water detected by and transferred from the temperature sensor 408. At step S302, the control section 700 then judges whether the detected temperature Tw of the cooling water exceeds a primary specified temperature T1. The primary specified temperature T1 indicates a reference value whether the cooling water of the temperature Tw can be used or not as the thermal energy for heating the indoor air of the compartment of the vehicle. That is, the primary specified temperature T1 is set as the temperature at which the indoor air of the compartment can be warmed, and the driver and passengers feel the air of the compartment warming up. For example, the primary specified temperature T1 can be set to not less than 60° C.

When the judgment result at step S302 indicates that the temperature Tw of the cooling water exceeds the primary specified temperature T1 ("YES" at step S302), it is judged that the heating can be performed only by using the cooling water. In this case, at step S303, the temperature control flow passage switching valve 413 joins the cooling water passage 400 and the temperature control cooling water passage 409 together in order to supply the cooling water heated by the fuel cell 100 into the heater core 100. The cooling water in the cooling water passage 400 thereby flows into the heater core 100. Because the primary water pump 401 is driven during the electric power generation in the fuel cell 100, the cooling water supplied by the primary water pump 401 flows into the temperature control cooling water passage 409. It is sufficient for the secondary water pump 411 to operate when the volume of the cooling water supplied by the primary water pump 401 becomes insufficient.

Next, at step S304, the opening ratio of the air mixing door 604 is controlled by driving the fan motor 602 according to a target temperature for the air conditioning in order to adjust the ratio of the air, to be used for the air conditioning, flowing through the heater core 410.

The air for the air conditioning is heated through the heater core 410 by transferring the thermal energy of the cooling water to the air for use of the air conditioning by the heater core 410. The inside air of the compartment of the vehicle is thereby heated to the target temperature.

The cooling water after transferring its thermal energy to the heater core 410 is returned to the cooling water passage 400 through the temperature control cooling water passage 409. The operation sequence described above can perform the heating of the inside air of the compartment by using the waste thermal energy contained in the cooling water generated during the electrical power generation in the fuel cell 100. This operation can reduce the total energy consumption of the vehicle equipped with the fuel cell system of the first embodiment during the heating process of heating the inside air of the compartment of the vehicle and can thereby increase the efficiency of the energy consumption of the vehicle.

Next, the water volume detection sensor 315 detects the volume Vw of water stored in the water storage tank 314 at step S305, the control section 700 judges whether the volume Vw of water in the water storage tank 314 exceeds a specified volume value V1 (at step S306). The specified volume value V1 is set to a volume value which is the minimum value for performing the electric power generation in the fuel cell 100, for example.

The judgment result at step S306 indicates that the volume Vw of water exceeds the specified volume V1 ("YES" at step S306), it can be judged that the volume Vw of water stored in the water storage tank 314 is an sufficient volume. At step S307, the volume Zs of dew condensation generated when the air in the air exhaust passage 301 is exhausted to the outside of the fuel cell system. The control section 700 judges whether the volume Zs of dew condensation is larger than a specified volume Z1 of dew condensation at step S308. The volume of dew condensation can be calculated based on the dew point detected by the dew condensation detection sensor 316 and the outdoor temperature detected by the outdoor temperature sensor 101.

It is possible to set the specified volume Z1 of dew condensation to a threshold value indicating whether or not fogs generated by the dew condensation of water component contained in the exhaust air affects the driving operation of the driver of the vehicle.

When the judgment result at step S308 indicates that the volume Zs of dew condensation is larger than the specified value Z1 ("YES" at step S308), the control section 700 instructs the air passage switching valve 309 to connect the air radiator 305. The control section 700 drives the fan 306 in order to send the air to the air radiator 305 (step S309). The exhaust air discharged from the fuel cell 100 is cooled by the air radiator 305, and a part of water vapor contained in the exhaust air is thereby condensed. This can prevent the generation of fogs by the dew condensation of water component contained in the exhaust air when the exhaust air is discharged to the outside of the vehicle.

On the contrary, when the judgment result at step S308 indicates that the volume Zs of dew condensation is not larger than the specified value Z1 ("NO" at step S308), the control section 700 instructs the air passage switching valve 309 to connect the radiator bypass passage 308 (at step S310). The exhaust air from the fuel cell 100 which is not cooled by the air radiator 305 is discharged to the outside of the vehicle.

When the judgment result at step S306 indicates the volume Vw of water stored in the water storage tank 314 is not larger than the specified volume value V1 ("NO" at step S306), it can be judged that the volume Vw is an insufficient volume. The control section 700 instructs the air passage switching valve 309 to connect the air radiator 305, and drives the fan 306 in order to blow a wind to the air radiator 305. It is thereby possible to condense a part of water vapor contained in the exhaust air discharged from the fuel cell 100 and to increase the volume Vw of water stored in the water storage tank 314.

When the judgment result at step S302 indicates that the temperature Tw of the cooling water does not exceed the primary specified temperature T1 ("NO" at step S302), it can be judged that there is a necessity of performing the heating by using the refrigeration cycle (as a heat pump). The control section 700 instructs the temperature control flow passage switching valve 413 to connect the temperature control cooling water bypass passage 412 and the temperature control cooling water passage 409 together in order to send the cooling water to the heater core 410. This cooling water is circulated only in the temperature control cooling water passage 409 (step S311). The control section 700 further drives the fan motor 602 and controls the opening ratio of the air mixing door 604 according to the target air conditioning temperature in order to control the volume of the air for the air conditioning passing through the heater core 410 (step S312).

Next, the control section 700 initiates the control operation of the expansion valves 509 and 510, and instructs the refrigerant passage switching valve 512 to connect the bypass passage 511. The control section 700 drives the refrigerant compressor 501 in order to operate refrigeration cycle for use of performing the heating (step S313).

Figure 4:
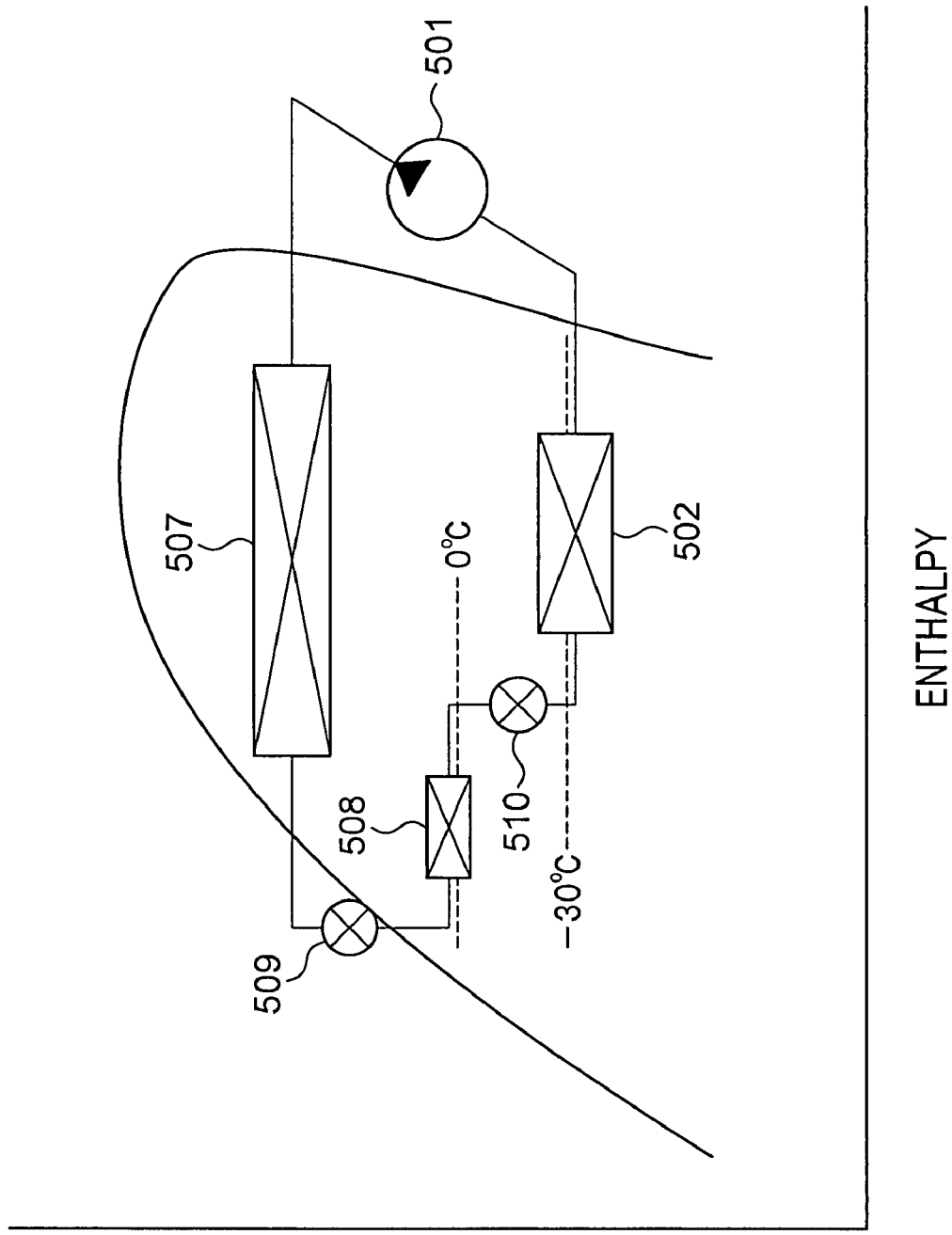
FIG. 4 is a mollier chart of a refrigeration cycle in the heating control of the fuel cell system according to the first embodiment.

FIG. 4 is a mollier chart of the refrigeration cycle for use of performing the heating in the fuel cell system according to the first embodiment.

Here, the operation of the refrigeration cycle for use of performing the heating will be explained with reference to the mollier chart shown in FIG. 4.

The refrigerant of a high temperature and a high pressure discharged from the refrigerant compressor 501 is supplied to the water-refrigerant heat exchanger 507. The thermal energy of the refrigerant is transferred to the cooling water which is flowing through the temperature control cooling water passage 409. Then, the cooling water heated by the refrigerant of a high temperature flows through the passage composed of the temperature control cooling water passage 409, the temperature control cooling water bypass passage 412, the temperature control flow passage switching valve 413, temperature control cooling water passage 409, and the heater core 410. The thermal energy of the cooling water is transferred to the air for use of the air conditioning through the heater core 410. The air heated at the heater core 410 is supplied into the inside of the compartment of the vehicle in order to heat the air therein. It is possible to perform the heating of the inside air of the compartment of the vehicle by using the thermal energy generated by the refrigeration cycle.

Next, the control section 700 controls the pressure of the refrigerant by adjusting the opening ratio of the expansion valve 509 at the upstream side in order that the temperature of the refrigerant is not less than the primary specified temperature. The primary specified temperature can be set to a temperature value at which water contained in the exhaust air in the air exhaust passage 301 is not sufficiently frozen when the heat exchange is performed between the refrigerant flowing through the refrigerant circulating passage 500 and the exhaust air flowing through the air exhaust passage 301 by the air-refrigerant heat exchanger 508. In the first embodiment, the primary specified temperature is set to a specified value within a temperature range of 0° C. (zero) to 5° C. In particular, it is preferred that the primary specified temperature is set to 0° C.

The pressure of the refrigerant can be changed according to the amount of heat absorption by the air-refrigerant heat exchanger 508 so that the temperature of the refrigerant becomes not less than 0° C., more preferably, is set to a value within a range of 0° C. to 5° C., The refrigerant (which is present in gas-liquid double layers) whose pressure is reduced by the expansion valves 509 at the upstream side flows to the air-coolant heat exchanger 508 and absorbs the thermal energy of, as latent heat, the exhaust air emitted from the fuel cell 100. On the other hand, the exhaust air flowing through the air exhaust passage 301 is cooled by the refrigerant and its temperature is thereby reduced.

In case of performing the heating by the refrigeration cycle, it is necessary to absorb the thermal energy of the outdoor air by the refrigerant-outdoor air heat exchanger 502. Accordingly, the control section 700 controls the opening ratio of the expansion valve 510 at the down stream side in order to control the pressure of the refrigerant so that the temperature of the refrigerant is not more than a secondary specified temperature. In the first embodiment, the secondary specified temperature is set to the temperature of the outdoor air detected by the outdoor temperature sensor 101. The mollier chart shown in FIG. 4 indicates an example in which the temperature of the outdoor air is −30° C., and the pressure of the refrigerant is reduced by the expansion valve 510 so that the temperature of the refrigerant is set within a range from −30° C. to −40° C.

The refrigerant flows through the refrigeration cycle composed of the refrigerant-outdoor air heat exchanger 502, the bypass passage 511, the accumulator 503, the inside heat exchanger 506, and the refrigerant compressor 501. The refrigerant absorbs the thermal energy of the outdoor air of −30° C. by the refrigerant-outdoor air heat exchanger 502. Because the refrigerant of a high pressure supplied from the refrigerant-outdoor air heat exchanger 502 does not flow in the inside heat exchanger 506, the inside heat exchanger 506 does not perform the heat exchange.

Next, the water volume detection sensor 315 detects the volume Vw of water stored in the water storage tank 314 (step S314), the control section 700 judges whether the volume Vw exceeds the specified volume value V1 or not (step S315). As a result, when the judgment result at step S315 indicates that the volume Vw does not exceed the volume V1 ("NO" at step S315), the control section 700 instructs the air passage switching valve 309 to connect the air radiator 305, and drives the fan 306 in order to blow the wind to the air radiator 305 (step S316). It is thereby possible to condense a part of water vapor contained in the exhaust air discharged from the fuel cell 100, and possible to increase the volume of water stored in the water storage tank 314.

On the other hand, when the judgment result at step S315 indicates that the volume Vw exceeds the volume V1 ("YES" at step S315), the control section 700 instructs the air passage switching valve 309 to connect the radiator bypass passage 308 (step S317). The exhaust air discharged from the fuel cell 100 flows into the air-refrigerant heat exchanger 508 without cooling the exhaust air by the air radiator 305, and the waste heat of the exhaust air can heat the refrigerant by the air-refrigerant heat exchanger 508.

Performing the heating control described above can heat the air in the compartment of the vehicle while recovering the waste heat (including sensible heat and latent heat by condensing the water vapor) of the exhaust air discharged from the fuel cell 100 by the refrigerant in the refrigeration cycle.

Further, the pressure reduction of the refrigerant is performed in two stages, at the upstream side of the air-refrigerant heat exchanger 508 and at the downstream side of the air-refrigerant heat exchanger 508. In particular, it is possible to prevent the freezing of water component contained in the exhaust air in the air exhaust passage 301 during the heat exchange performed by the air-refrigerant heat exchanger 508 by controlling the pressure of the refrigerant so that the temperature of the refrigerant is not less than 0° C., in particular, is set to a specified value within a temperature range of 0° C. to 5° C., and more preferably is set to 0° C., in the primary stage at the upstream side. It is thereby possible to avoid any freezing the water component contained in the exhaust air discharged from the fuel cell 100 in the passages.

When the waste heat, supplied by the cooling water discharged from the fuel cell 100, contained in the cooling water is directly used for heating the air in the compartment of the vehicle, it is possible to increase the energy efficiency of the vehicle because the refrigerant compressor 501 is not used. Still further, it is possible to prevent the generation of fog from the exhaust air discharged to the outdoor of the vehicle by cooling the exhaust air according to demands. This can prevent the occurrence of poor visibility of the driver owing to the generation of fog and can keep the driver's safety.

On performing the heating by the refrigeration cycle, because the air is cooled by the air-refrigerant heat exchanger 508, it is possible to condense water component contained in the air and possible to prevent the generation of fog from water vapor contained in the exhaust air at the outside of the vehicle.

Still further, because the control section 700 monitors the volume of water stored in the water storage tank 314, it is possible to avoid the occurrence of decreasing the water to be used for humidification and the occurrence of stopping the electric power generation by the fuel cell 100. In the fuel cell system according to the first embodiment, although the humidification for the fuel cell 100 is performed by the moisturizing device 303, it is possible to use another technical manner in which liquid water is supplied into the fuel cell 100 in order to perform the humidification and cooling. This case requires a strict water-management for the water storage tank 314.

[Air Cooling Mode]

Next, a description will now be given of the air conditioning control under a cooling mode in the fuel cell system according to the first embodiment of the present invention.

Figure 5:
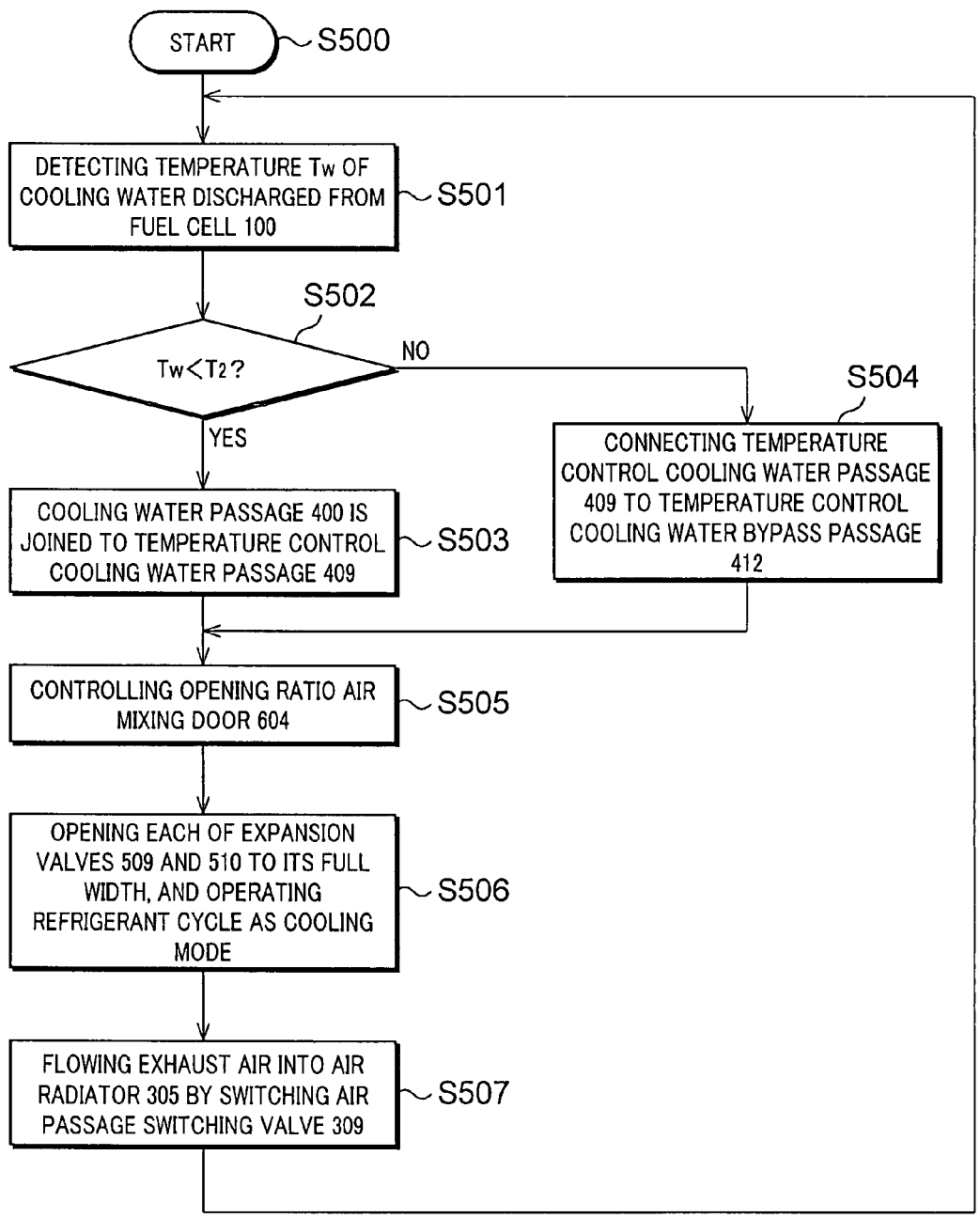
FIG. 5 is a flow chart showing the control flow for the air conditioning under the cooling mode in the fuel cell system according to the first embodiment.
Figure 6:
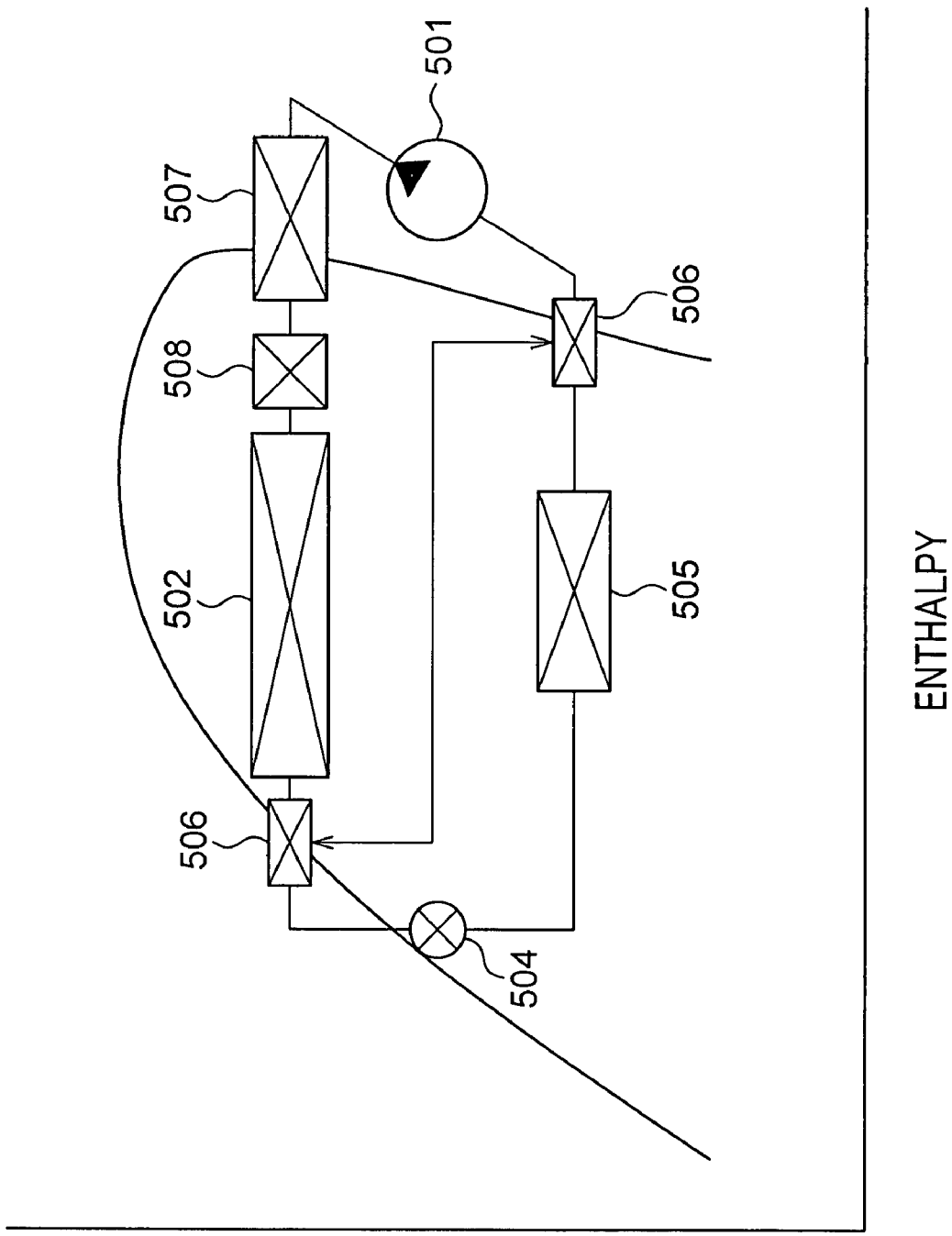
FIG. 6 is a mollier chart of the refrigeration cycle in the cooling control of the fuel cell system according to the first embodiment.

FIG. 5 is a flow chart showing the control flow for the air conditioning under the cooling mode in the fuel cell system according to the first embodiment. FIG. 6 is a mollier chart of the refrigeration cycle under the cooling mode in the fuel cell system according to the first embodiment.

As shown in FIG. 5, the temperature sensor 408 detects the temperature Tw of the cooling water at the outlet of the fuel cell 100 (step S501). Next, the control section 700 judges whether or not the temperature Tw of the cooling water is lower than the secondary specified temperature T2 (step S502). The secondary specified temperature T2 is a reference value for judging whether the thermal energy of the refrigerant in the refrigeration cycle is transferred to the cooling water or not. The secondary specified temperature T2 is set to a temperature value which is lower than an allowable temperature of the cooling water in the cooling system. For example, it is possible to set the secondary specified temperature T2 to a value of not more than 75° C.

When the judgment result at step S502 indicates that the temperature Tw of the cooling water is lower than the secondary specified temperature T2 ("YES" at step S502), it can be recognized that the thermal energy of the refrigerant in the refrigeration cycle is discharged to, namely, transferred to the cooling water side. The control section 700 controls the temperature control flow passage switching valve 413 so that the cooling water passage 400 is joined to the temperature control cooling water passage 409 in order that the cooling water heated by the fuel cell 100 flows into the heater core 410 (step S503). The cooling water in the cooling water passage 400 thereby flows into the heater core 410. The control section 700 drives the secondary water pump 411 according to need.

On the other hand, when the judgment result at step S502 indicates that the temperature Tw of the cooling water is not lower than the secondary specified temperature T2 ("NO" at step S502), it can be recognized that it is difficult to transfer the thermal energy of the refrigerant to the cooling water in the refrigeration cycle. The control section 700 instructs the temperature control flow passage switching valve 413 so that the temperature control cooling water passage 409 is joined to the temperature control cooling water bypass passage 412 (at step S504). At this time, the cooling water passage 400 is not joined to the temperature control cooling water passage 409 and is not also joined to the temperature control cooling water bypass passage 412. Because this condition allows that the water-refrigerant heat exchanger 507 of the refrigeration cycle is separated from the circulation of the cooling water for the fuel cell 100, it is possible to prevent increasing the temperature of the cooling water by transferring the thermal energy of the refrigeration cycle to the cooling water for the fuel cell 100. This can prevent the deterioration of the cooling performance of the fuel cell 100.

Next, the control section 700 drives the fan motor 602, and controls the opening ratio of the air mixing door 604 according to a target temperature of the air conditioning in order to adjust the ratio of the air flowing through the heater core 410 (step S505).

The control section 700 opens each of the expansion valves 509 and 510 to its full width. The control section 700 instructs the refrigerant passage switching valve 512 so that the refrigerant passage switching valve 512 joins to the evaporator 505. The control section 700 further drives the refrigerant compressor 501 in order to switch the current mode of the refrigeration cycle to the cooling mode (step S506). The control section 700 instructs the air passage switching valve 309 so that the air passage switching valve 309 joins to the air radiator 305, and drives the fan 307 in order to reduce the temperature of the exhaust air flowing through the air exhaust passage 301 (step S507).

A description will now be given of the operation of the refrigeration cycle when the refrigeration cycle is used of performing the cooling mode with reference to the mollier chart of the refrigeration cycle shown in FIG. 6.

The refrigerant of a high temperature and a high pressure discharged from the refrigerant compressor 501 flows into the water-refrigerant heat exchanger 507. In the water-refrigerant heat exchanger 507, the thermal energy of the refrigerant is discharged to the cooling water. Next, the thermal energy of the refrigerant is discharged to the exhaust air in the air-refrigerant heat exchanger 508, and the thermal energy of the refrigerant is then discharged in the refrigerant-outdoor air heat exchanger 502 to the outside of the vehicle. After this, the refrigerant passes through the inside heat exchanger 506. In the refrigerant expansion valve 504, the pressure of the refrigerant is decreased. That is, the temperature of the refrigerant becomes low (approximate 0° C.) and the pressure of the refrigerant becomes low. The refrigerant of a low temperature and low pressure then cools the air to be used for the air conditioning in the evaporator 505. The temperature of the air for the air conditioning is adjusted by the heater core 410 according to need, and the air is supplied into the compartment of the vehicle. The cooling manner for the compartment of the vehicle described above can be performed by using the fuel cell system of the first embodiment.

As described above, because the thermal energy of the refrigerant is transferred to the cooling water by using the water-refrigerant heat exchanger 507, it is possible to increase the COP (coefficient of performance) when compared with the case in which the thermal energy is not discharged in the water-refrigerant heat exchanger 507. It is possible to further increase the COP by transferring the thermal energy of the refrigerant to the air by using the air-refrigerant heat exchanger 508.

Still further, because the cooling performance can be increased, it is possible to rapidly cool the inside of the compartment of the vehicle.

Still further, it is possible to increase the COP by increasing the heat-transfer rate from the refrigerant to the exhaust air in the air-refrigerant heat exchanger 508 by reducing the temperature of the exhaust air in the air exhaust passage 301 at step S507.

In addition, like the heating control operation described above, it is possible to perform both the controls during the cooling control operation, the control to keep the volume of water in the water storage tank 314, and the control from step S305 to step S310 in order to prevent the generation of fog at the outside of the vehicle by condensing the water vapor contained in the exhaust air.

[Dehumidification Mode]

Next, a description will now be given of the air conditioning control under the dehumidification mode.

Figure 7:
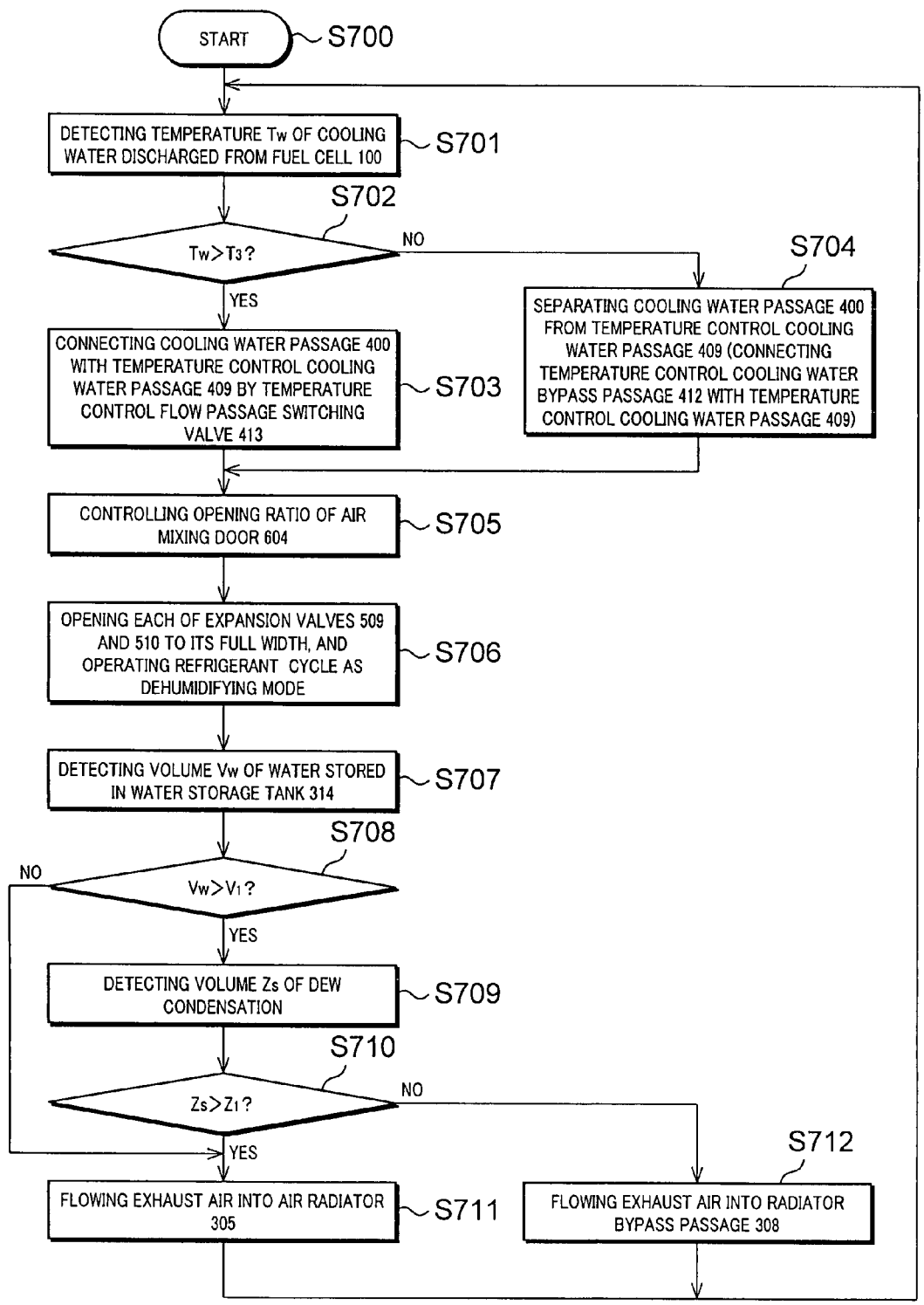
FIG. 7 is a flow chart showing the control flow for the air conditioning under a dehumidifying mode in the fuel cell system according to the first embodiment.

FIG. 7 is a flow chart showing the control flow of the air conditioning under the dehumidifying mode in the fuel cell system according to the first embodiment.

As shown in FIG. 7, the temperature sensor 408 detects the temperature Tw of the cooling water at the outlet of the fuel cell 100 (step S701). The control section 700 judges whether the temperature Tw of the cooling water exceeds a third specified temperature T3 or not (step S702). The third specified temperature T3 is a reference value for use of judging whether or not the thermal energy of the cooling water can heat the air of the air conditioning which has been cooled in the evaporator 505. The third specified temperature T3 is set to a lowest temperature, for example, 30° C., which is the lowest temperature for heating the air to be used in the air conditioning.

When the judgment result at step S702 indicates that the temperature Tw of the cooling water exceeds the third specified temperature T3 ("YES" in step S702), it can be recognized that the cooling water can heat the air for the air conditioning. The control section 700 instructs the temperature control flow passage switching valve 413 to connect the cooling water passage 400 and the temperature control cooling water passage 409 together. Thereby, the cooling water which has been heated by the fuel cell 100 flows into the heater core 410 (step S703). In other words, the cooling water in the cooling water passage 400 flows into the heater core 410. The control section 700 drives the secondary water pump 411 according to need.

On the other hand, when the judgment result at step S702 indicates that the temperature Tw of the cooling water does not exceed the third specified temperature T3 ("NO" in step S702), it can be recognized that it is impossible to heat the air to be used for the air conditioning by the cooling water. In other words, it is insufficient to heat the air for the air conditioning only by the thermal energy of the cooling water. In this case, the control section 700 instructs the temperature control flow passage switching valve 413 so that the temperature control cooling water passage 409 is connected to the bypass passage 412. The control section 700 further drives the secondary water pump 411 (step S704). This control can form the closed circulation loop in which the cooling water flows only through the temperature control cooling water passage 409 and the bypass passage 412. Such a closed circulation loop can obtain the necessary thermal energy for use of heating the air from the refrigeration cycle through the water-refrigerant heat exchanger 507.

Next, the control section 700 drives the fan motor 602, and controls the opening ratio of the air mixing door 604 according to the target temperature to which the temperature of the air for the air conditioning approaches (step S705). The thermal energy of the cooling water is transferred to the air for the air conditioning when the air to be used in the air conditioning passes through the heater core 410. The air to be used for the air conditioning is heated by the heater core 410.

Next, the control section 700 instructs both the expansion valves 509 and 510 so that each of the expansion valves 509 and 510 becomes open to its full width. The control section 700 instructs the refrigerant passage switching valve 512 to connect the evaporator 505. The control section 700 further drives the refrigerant compressor 501 in order to switch the current mode of the refrigeration cycle to the dehumidification mode (step S706).

The operation of the refrigeration cycle under the dehumidification mode is the same of the operation at step S505 of the cooling mode of the refrigeration cycle described above. The air for the air conditioning is cooled by the evaporator 505 in order to condense water vapor contained in the air, and has the dew point at the temperature. The air for the air conditioning is heated by the heater core 410, and the dehumidified air is supplied to the inside of the compartment of the vehicle.

Next, during the dehumidification mode, the control section 700 performs both the controls, the control to keep the volume of water in the water storage tank 314 at step S707 to step S712 and the control of preventing the generation of fog at the outside of the vehicle by condensing the water vapor contained in the exhaust air. Because those control operations are the same of those at step S305 to step S310 prescribed, the explanation thereof is omitted here.

[Air Conditioning Off Mode]

Figure 8:
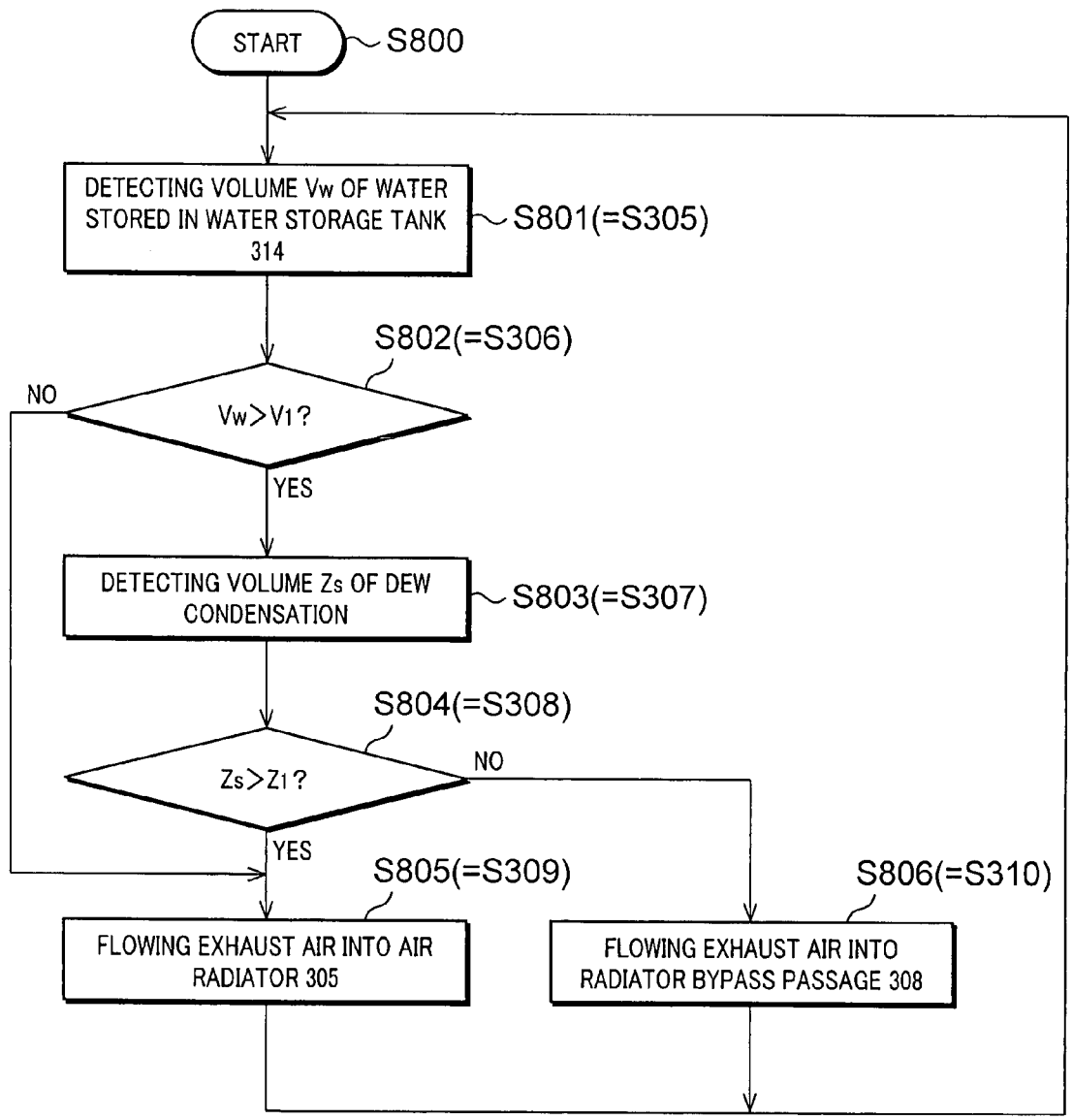
FIG. 8 is a flow chart showing the control flow under an air conditioning off mode in the fuel cell system according to the first embodiment.

Next, a description will now be given of the air conditioning off mode in the fuel cell system according to the first embodiment. FIG. 8 is a flow chart showing the control flow of the air conditioning off mode in the fuel cell system according to the first embodiment.

As shown in FIG. 8, the control section 700 performs both the controls, the control designated by steps S801, S802, S803, S804, S805, and S806 to keep the volume of water in the water storage tank 314 and the control of preventing the generation of fog at the outside of the vehicle by condensing the water vapor contained in the exhaust air. Because those control operations are the same of those at steps S305, S306, S307, S308, S309, and step S310 which have been described above, the explanation thereof is omitted here.

It is thereby possible to keep the necessary volume of water in the water storage tank 314 and to prevent the generation of fog by the exhaust air even if the air conditioning off mode which does not perform the air conditioning by using the refrigeration cycle is selected.

Second Embodiment

A description will now be given of the fuel cell system according to the second embodiment of the present invention. In particular, the different components between the first embodiment and the second embodiment will be explained and the explanation for the same components between the first and second embodiments is omitted here.

Figure 9:
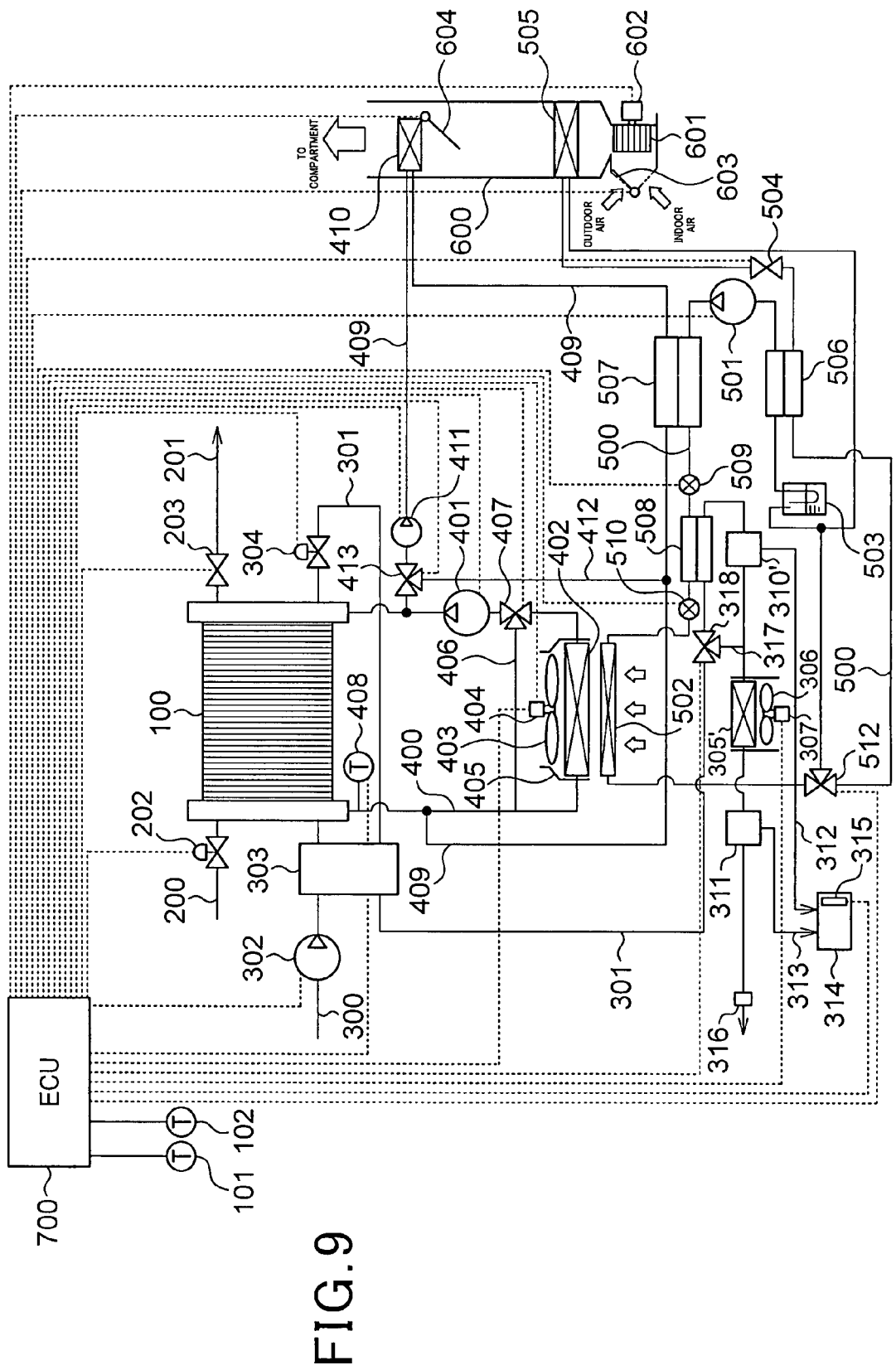
FIG. 9 is a schematic view showing a configuration of a fuel cell system according to a second embodiment of the present invention.

FIG. 9 is a schematic view showing the configuration of the fuel cell system according to the second embodiment. As shown in FIG. 9, in the fuel cell system of the second embodiment, the air radiator 305' is disposed at the downstream side of the air-refrigerant heat exchanger 508 in the air exhaust passage 301. Further, the primary gas liquid separator 310' is disposed between the air radiator 305' and the air-refrigerant heat exchanger 508 in the air exhaust passage 301. Still further, a bypass passage 317 for the refrigerant heat exchanger capable of bypassing the air-refrigerant heat exchanger 508 is mounted on the air exhaust passage 301. Through the bypass passage 317, the upstream side of and the downstream side of the air-refrigerant heat exchanger 508 in the air exhaust passage 301 are joined together. A flow switching valve 318 is disposed at the branch point at the upstream side of the bypass passage 317 in the air exhaust passage 301. The flow switching valve 318 switches the air flow to the air-refrigerant heat exchanger 508 side or to the bypass passage 317 side. The bypass passage 317 for the refrigerant heat exchanger corresponds to a secondary bypass passage defined in claims according to the present invention.

The configuration of the fuel cell system according to the second embodiment can obtain the same effects of the configuration of the fuel cell system of the first embodiment. In the fuel cell system of the second embodiment, while operating the refrigeration cycle as the heating, it is possible to bypass the air-refrigerant heat exchanger 508 by using the bypass passage 317 even if the temperature of the refrigerant becomes not more than 0° C. after decreasing its pressure by the expansion valve 509 at the upstream side. It is thereby possible to continue the electric power generation of the fuel cell 100 even if the water component contained in the exhaust air is frozen in the air-refrigerant heat exchanger 508.

In addition, like the configuration of the fuel cell system of the second embodiment, when the air radiator 305' is disposed at the downstream side of the air-refrigerant heat exchanger 508, there is a possibility of heating the exhaust air by the thermal energy of the refrigerant in the refrigeration cycle at the air-refrigerant heat exchanger 508 under the cooling mode and thereby a possibility of adequately recovering the water component contained in the exhaust air. This phenomenon can be avoided by bypassing the air-refrigerant heat exchanger 508 from the exhaust air which flows through the air exhaust passage 301 by using the bypass passage 317.

Third Embodiment

A description will now be given of the fuel cell system according to the third embodiment of the present invention. In particular, the different components between the first embodiment and the third embodiment will be explained, and the explanation for the same components between the first and third embodiments is omitted here.

Figure 10:
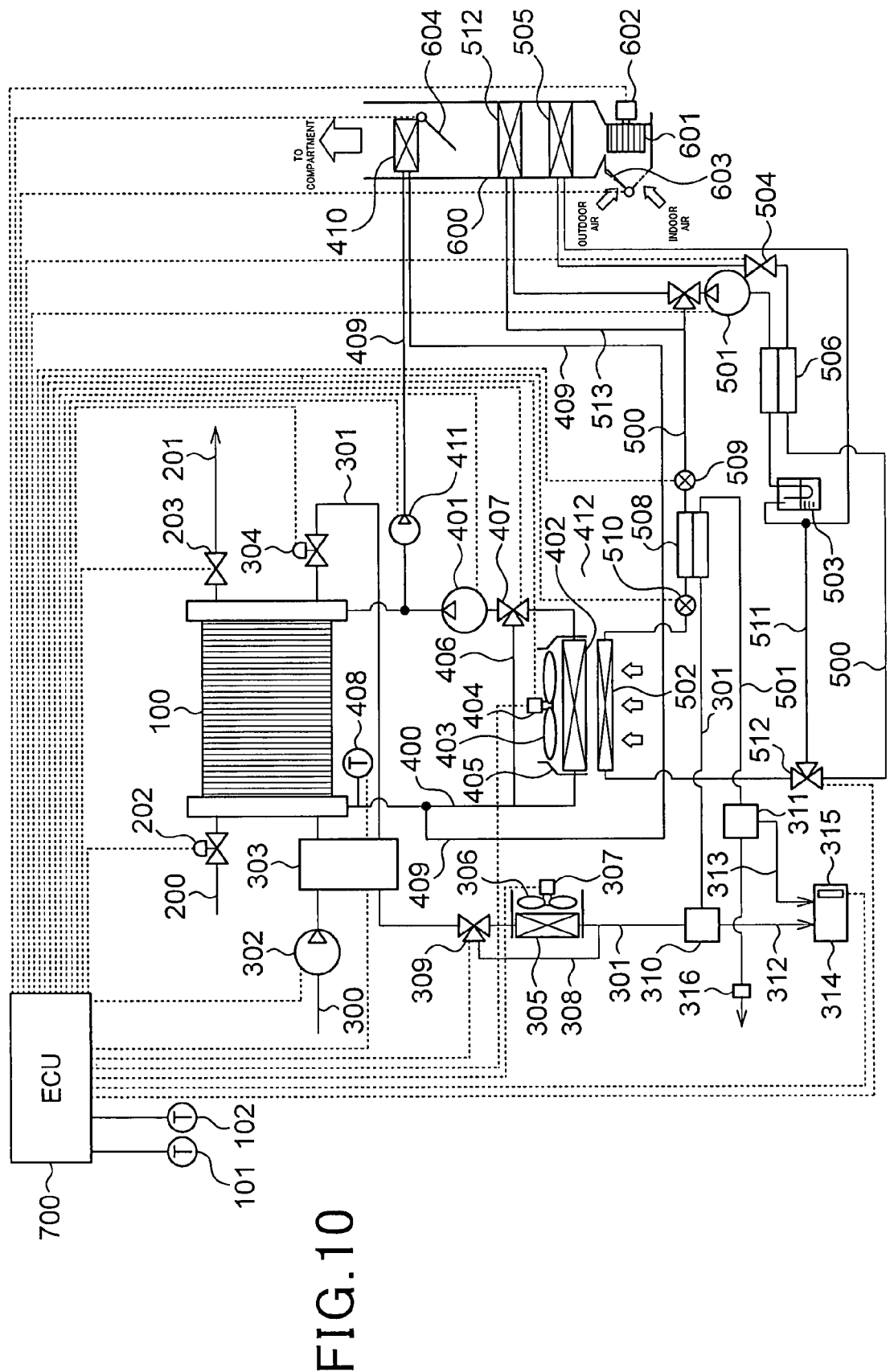
FIG. 10 is a schematic view showing a configuration of a fuel cell system according to a third embodiment of the present invention.

FIG. 10 is a schematic view showing a configuration of the fuel cell system according to the third embodiment of the present invention. As shown in FIG. 10, the configuration of the third embodiment does not have the water-refrigerant heat exchanger 507, and has a heat exchanger 512 capable of adjusting the temperature 512 instead. This heat exchanger 512 is disposed in the air conditioning case 600. The heat exchanger 512 is configured to suck the refrigerant of a high temperature and a high pressure discharged from the refrigerant compressor 501 through a refrigerant passage 513 and to increase the temperature of the air to be used for the air conditioning by the refrigerant. The air for the air conditioning whose temperature is increased by the refrigerant is supplied to the inside of the compartment of the vehicle and heats the air in the compartment.

The refrigerant passage 513 branches at the downstream side of the refrigerant compressor 501 and joins again. A flow switching valve 514 is disposed at the branch point of the refrigerant passage 513 in the refrigerant circulating passage 500. The flow switching valve 514 switches the refrigerant flow to the refrigerant circulating passage 500 side or to the heat exchanger 512 side.

According to the configuration of the fuel cell system of the third embodiment, it is possible to directly use the thermal energy of the refrigerant in the refrigeration cycle for heating the air in the compartment of the vehicle without using the cooling water to be supplied to the heater core 410.

Fourth Embodiment

A description will now be given of the fuel cell system according to the fourth embodiment of the present invention. In particular, the different components between the first and fourth embodiments will be explained and the explanation for the same components between the first and fourth embodiments is omitted here.

FIG. 11 is a schematic view showing a dew condensation detection sensor 316 to be equipped in the fuel cell system according to the fourth embodiment of the present invention.

The dew condensation detection sensor 316 is composed of a pipe 316a, plural fins 316b, a heat transfer member 316c, a mirror surface 316d, a luminous part 316e, and a light receiving part 316f. Through the pipe 316a, the exhaust air discharged from the air exhaust passage 301 passes. The plural fins 316b are formed on the outer circumference surface of the pipe 316a as shown in FIG. 11. The heat transfer member 316c, the mirror surface 316d, the luminous part 316e, and the light receiving part 316f are formed at the inside of the pipe 316a. In particular, those components such as the heat transfer member 316c, the mirror surface 316d, the luminous part 316e, and the light receiving part 316f are formed at the upper side on the inner wall surface of the pipe 316a.

The temperature of the mirror surface 316d has approximately the same temperature of the outdoor air by the presence of the fin 316n and the heat transfer member 316c. The luminous part 316e is configured to emit infrared ray, for example. The light receiving part 316f is configured to receive the infrared ray reflected by the mirror surface 316d.

Because the configuration of the dew condensation detection sensor 316 described above enables the mirror surface part 316d to have the same value of the outdoor temperature, it is possible to judge whether fog is generated by discharging the exhaust air to the outside of the vehicle and by condensing the water vapor contained in the exhaust air.

An available dew point recorder or a dew indicator has a complicated configuration in general because a mirror surface therein must be warmed and adjusted. On the contrary, the dew condensation detection sensor 316 in the fuel cell system according to the fourth embodiment has a simple configuration and precisely judges whether fog is generated when the exhaust air is discharged to the outside of the vehicle.

According to the configuration of the dew condensation detection sensor 316 in the fuel cell system of the fourth embodiment, it is possible to judge whether fog is generated when the exhaust air is discharged to the outside of the vehicle with a simple configuration. Further, it is possible to prevent occurrence of error detection by water drop even if the water is adhered on the inner wall of the pipe 316a, because the heat transfer member 316c, the mirror surface 316d, the luminous part 316e, and the light receiving part 316f are formed at the upper side on the inner wall surface of the pipe 316a Another Embodiment In each embodiment according to the present invention, the primary gas liquid separator 310 (310' in the second embodiment) and the secondary gas liquid separator 311 are disposed at the downstream side of the air radiator 305 (305' in the second embodiment) and the air-refrigerant heat exchanger 508. It is possible to eliminate the primary gas liquid separator 310 (310' in the second embodiment) and the secondary gas liquid separator 311, and to have the function of the gas liquid separation in both the air radiator 305 (305' in the second embodiment) and the air-refrigerant heat exchanger 508, instead.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A fuel cell system comprising:
   a fuel cell for generating electrical power by performing electrochemical reaction of combining oxidizing agent gas and fuel gas;
   an oxidizing agent gas exhaust passage through which non-reacted residual oxidizing agent gas in the oxidizing agent gas supplied to the fuel cell passes to the outside of the fuel cell system;
   a refrigerant circulation passage through which refrigerant is circulated;
   a refrigerant compressor for compressing the refrigerant and sending the compressed refrigerant to the refrigerant circulation passage;
   a refrigerant-outdoor air heat exchanger for performing heat exchange between an outdoor air and the refrigerant discharged from the refrigerant compressor;
   an oxidizing agent gas-refrigerant heat exchanger for performing heat exchange between the oxidizing agent gas passing through the oxidizing agent gas exhaust passage and the refrigerant passing through the refrigerant circulation passage;
   a primary pressure reducing valve for reducing a pressure of the refrigerant, which is disposed between the refrigerant compressor and the oxidizing agent gas-refrigerant heat exchanger; and
   a secondary pressure reducing valve for reducing a pressure of the refrigerant, which is disposed between the oxidizing agent gas-refrigerant heat exchanger and the refrigerant-outdoor air heat exchanger,
   wherein during the heat transfer between the oxidizing agent gas and the refrigerant by the oxidizing agent gas-refrigerant heat exchanger, the primary pressure reducing valve reduces the pressure of the refrigerant so that a temperature of the refrigerant becomes not less than a specified temperature at which water component contained in the oxidizing agent gas does not freeze.

2. The fuel cell system according to claim 1, wherein the specified temperature is within a range of 0° C. to 5° C.

3. The fuel cell system according to claim 1, wherein during the heat transfer between the oxidizing agent gas and the refrigerant performed by the oxidizing agent gas-refrigerant heat exchanger, the secondary pressure reducing valve reduces the pressure of the refrigerant so that a temperature of the refrigerant becomes not more than an outdoor temperature.

4. The fuel cell system according to claim 1, further comprising:
- a third pressure reducing valve for reducing the pressure of the refrigerant at an outlet side of the refrigerant-outdoor air heat exchanger; and
- an evaporator for evaporating the refrigerant of a low pressure which is reduced by the third pressure reducing valve, and for cooling air-conditioning air to be used of cooling an inside of a compartment,
- wherein an opening ratio of each of the primary pressure reducing valve and the secondary pressure reducing valve is changeable, and
- each of the primary pressure reducing valve and the secondary pressure reducing valve is open to its full width while the evaporator cools the air-conditioning air.

5. The fuel cell system according to claim 1, further comprising an oxidizing agent gas radiator mounted on the oxidizing agent gas exhaust passage for discharging thermal energy of the oxidizing agent gas, which flows through the oxidizing agent gas exhaust passage, to the outside of the fuel cell system.

6. The fuel cell system according to claim 5, further comprising a fan for sending outdoor air to the oxidizing agent gas radiator.

7. The fuel cell system according to claim 5, further comprising a primary bypass passage for bypassing the oxidizing agent gas radiator from the oxidizing agent gas exhaust passage through which the oxidizing agent gas flows.

8. The fuel cell system according to claim 1, further comprising a secondary bypass passage for bypassing the oxidizing agent gas-refrigerant heat exchanger from the oxidizing agent gas exhaust passage through which the oxidizing agent gas flows.

9. The fuel cell system according to claim 1, further comprising a dew condensation detection sensor for detecting dew condensation generated from water component contained in the oxidizing agent gas discharged from the oxidizing agent gas exhaust passage to the outside of the fuel cell system,
- wherein on detecting the generation of the dew condensation by the dew condensation detection sensor, the oxidizing agent gas radiator increases its amount of thermal energy of the oxidizing agent gas to be radiated.

10. The fuel cell system according to claim 9, wherein the dew condensation detection sensor is made of a dew point instrument.

11. The fuel cell system according to claim 10, wherein the dew point detection sensor is composed of a pipe, a mirror surface, a luminous part, a light receiving part, and a heat transfer means, in which the oxidizing agent gas to be discharged from the oxidizing agent gas exhaust passage to the outside passes through the pipe, the mirror surface is disposed on the inner surface of the pipe, the luminous part emits light to the mirror surface, the light receiving part receives the light reflected by the mirror surface, and the heat transfer means transfers the thermal energy between the mirror surface and the outdoor air.

12. The fuel cell system according to claim 11, wherein the mirror surface is disposed on the inner surface at the upper side of the pipe.

13. The fuel cell system according to claim 1, wherein the specified temperature is 0° C.

* * * * *